United States Patent [19]
Laubenstein et al.

[11] 4,153,019
[45] May 8, 1979

[54] PEAK CYLINDER COMBUSTION PRESSURE IGNITION SPARK TIMING SYSTEM

[75] Inventors: Allan E. Laubenstein; Donald V. Starich; Mitchell L. Brown, all of Kokomo, Ind.

[73] Assignee: General Motors Corporation, Detroit, Mich.

[21] Appl. No.: 789,239

[22] Filed: Apr. 20, 1977

[51] Int. Cl.$^2$ ............................................. F02P 5/04
[52] U.S. Cl. ........................... 123/117 R; 123/117 D; 123/146.5 A
[58] Field of Search ............... 123/117 R, 146.5 A, 123/117 D, 148 E

[56] References Cited

U.S. PATENT DOCUMENTS

| | | | |
|---|---|---|---|
| 3,749,070 | 7/1973 | Oishi et al. | 123/117 R |
| 3,875,912 | 4/1975 | Bullo | 123/148 E |
| 3,896,776 | 7/1975 | Ford | 123/117 R |
| 3,921,610 | 11/1975 | Hartig | 123/148 E |
| 3,923,021 | 12/1975 | Stark | 123/117 R |
| 3,923,022 | 12/1975 | Schull | 123/117 D |
| 3,957,023 | 5/1976 | Peterson | 123/146.5 A |
| 3,981,282 | 9/1976 | Ford | 123/117 R |
| 3,989,024 | 11/1976 | Lai et al. | 123/148 E |
| 3,996,911 | 12/1976 | Canup | 123/117 D |
| 4,054,111 | 10/1977 | Sand | 123/117 R |
| 4,063,538 | 12/1977 | Powell et al. | 123/146.5 |

FOREIGN PATENT DOCUMENTS 2302160  7/1973  Fed. Rep. of Germany ...... 123/117 R

OTHER PUBLICATIONS

Paper Entitled "Closed Loop Control of Spark Timing," by J. David Powell, at the Automotive Engine Control Workshop, 8–9 Jul. 1975.

Primary Examiner—Charles J. Myhre
Assistant Examiner—Raymond A. Nelli
Attorney, Agent, or Firm—Richard G. Stahr

[57] ABSTRACT

The ignition spark events of the cylinders of an internal combustion engine are timed to provide peak cylinder combustion pressure at a predetermined engine crankshaft angle relative to piston top dead center. The engine crankshaft angle at which the peak cylinder combustion pressure of a selected monitored engine cylinder occurs during each power stroke thereof is detected and indicated by a logic signal. An electrical peak pressure error signal indication of the engine crankshaft angle difference between the crankshaft angle at which peak cylinder combustion pressure actually occurs and the predetermined desired engine crankshaft angle is electronically generated during the period of time required for the engine crankshaft to rotate through a constant predetermined engine crankshaft angle at all engine speeds. This signal indication is electronically processed by an electronic circuit combination which, in response thereto, adjusts the ignition spark timing in the direction to provide ignition spark events at the engine crankshaft angle which results in peak cylinder combustion pressure at the predetermined desired engine crankshaft angle.

10 Claims, 15 Drawing Figures

PEAK CYLINDER COMBUSTION PRESSURE IGNITION SPARK TIMING SYSTEM

This invention is directed to an improved internal combustion engine ignition spark timing system and, more specifically, to an improved internal combustion engine ignition spark timing system which times the ignition spark events of an internal combustion engine to provide peak cylinder combustion pressure at a predetermined desired engine crankshaft angle relative to piston top dead center.

Generally, internal combustion engine ignition spark events are timed in response to engine speed and load as indicated by engine vacuum. To provide automatic ignition spark adjustment while the engine is in the running mode in response to changes in engine speed and/or vacuum, most modern ignition distributors are designed for mechanical adjustment of ignition spark timing within a limited range. With breaker contact set type distributors, the angular position of the contact set relative to the rotatable distributor cam establishes the crankshaft angle at which ignition spark events occur. To provide engine speed ignition spark timing adjustment, this angular position is mechanically changed by a centrifugal weight assembly rotated by the distributor shaft to provide ignition spark advance and retard in response to increases and decreases, respectively, of engine speed. To provide engine load ignition spark adjustment, this angular position is changed by a vacuum motor exposed to engine vacuum and mechanically linked to a rotatable breaker plate upon which the breaker contact set is mounted to provide ignition spark advance and retard in response to changes of engine vacuum. With magnetic pickup type ignition distributors, the angular position of the magnetic circuit pole piece teeth relative to the rotor teeth are similarly mechanically changed to provide ignition spark timing adjustment. The ignition spark timing provided by both these mechanically adjustable systems may be subject to considerable error from the ideal because of manufacturing tolerances and because the mechanical assemblies provide only a single rigid distributor ignition spark advance curve which is predetermined to provide at least acceptable engine performance.

There are many other factors, however, that enter into ignition spark timing such as humidity, ambient temperature, altitude, atmospheric pressure, fuel-air ratio and exhaust gas recirculation. In view of these many parameters other than engine speed and load which affect ideal ignition spark timing, the mechanical, predetermined ignition spark advance systems are incapable of providing ideal ignition spark advance under all engine operating conditions.

It has been found that desirably low brake specific fuel consumption (BSFC) may be obtained during normal engine operating conditions when the peak cylinder combustion pressure occurs at an optimum engine crankshaft angle. An ignition spark timing system which times ignition spark events to provide peak cylinder combustion pressure at a predetermined desired engine crankshaft angle by adjusting ignition spark timing in response to the difference between the occurrence of peak cylinder combustion pressure and the predetermined desired engine crankshaft angle is particularly advantageous. The parameter to which it is responsive may be simply and accurately determined; it does not require the use of unreliable and inaccurate sensor devices; only one engine operating parameter is monitored; and, most importantly, it automatically provides optimum ignition spark timing under all engine operating conditions because ignition spark is timed relative to the peak cylinder combustion pressure of the engine whereby all of the many variables which affect cylinder "burn time" enter into the ignition spark timing determination.

It is, therefore, an object of this invention to provide an improved internal combustion engine ignition spark timing system.

It is another object of this invention to provide an improved internal combustion engine ignition spark timing system which times the ignition spark events in a manner to achieve peak cylinder combustion pressure at a predetermined desired engine crankshaft angle relative to piston top dead center.

It is a further object of this invention to provide an improved internal combustion engine ignition spark timing system wherein electronic circuitry is responsive to an electrical timing error signal indication of the engine crankshaft angle difference between the occurrence of peak cylinder combustion pressure and a predetermined desired engine crankshaft angle for timing the ignition spark events in a manner to provide peak cylinder combustion pressure substantially at the predetermined desired engine crankshaft angle.

It is an additional object of this invention to provide an improved internal combustion engine ignition spark timing system wherein an electrical timing error signal indication of the engine crankshaft angle difference between the occurrence of peak cylinder combustion pressure and a predetermined desired engine crankshaft angle is generated for a period of time corresponding to a predetermined constant engine crankshaft angle of rotation and is electronically processed in a manner to provide for ignition spark timing adjustment in the direction to provide peak cylinder combustion pressure at the predetermined desired engine crankshaft angle.

It is another object of this invention to provide an improved internal combustion engine ignition spark timing system wherein an electronic circuit combination produces an ignition dwell signal of a duration equal to a predetermined constant engine crankshaft angle which is initiated by a "start of ignition dwell" signal pulse also produced by the electronic circuit combination at the engine crankshaft angle which will result in the occurrence of peak cylinder combustion pressure at a predetermined desired engine crankshaft angle in response to an electrical timing error signal indication of the engine crankshaft angle difference between peak cylinder combustion pressure and the predetermined desired engine crankshaft angle.

In accordance with this invention, a peak cylinder combustion pressure ignition spark timing system is provided wherein internal combustion engine ignition spark timing events are timed in such a manner that peak cylinder combustion pressure occurs at a predetermined desired engine crankshaft angle in response to an electrical peak pressure error signal indication of the engine crankshaft angle difference between the crankshaft angle at which peak cylinder combustion pressure actually occurs and the predetermined desired engine crankshaft angle.

For a better understanding of the present invention, together with additional objects, advantages and features thereof, reference is made to the following description and accompanying drawings in which:

FIGS. 1 through 4, inclusive, set forth partially in schematic and partially in block form respective portions of the peak cylinder combustion pressure ignition spark timing system of this invention;

Figure 1:
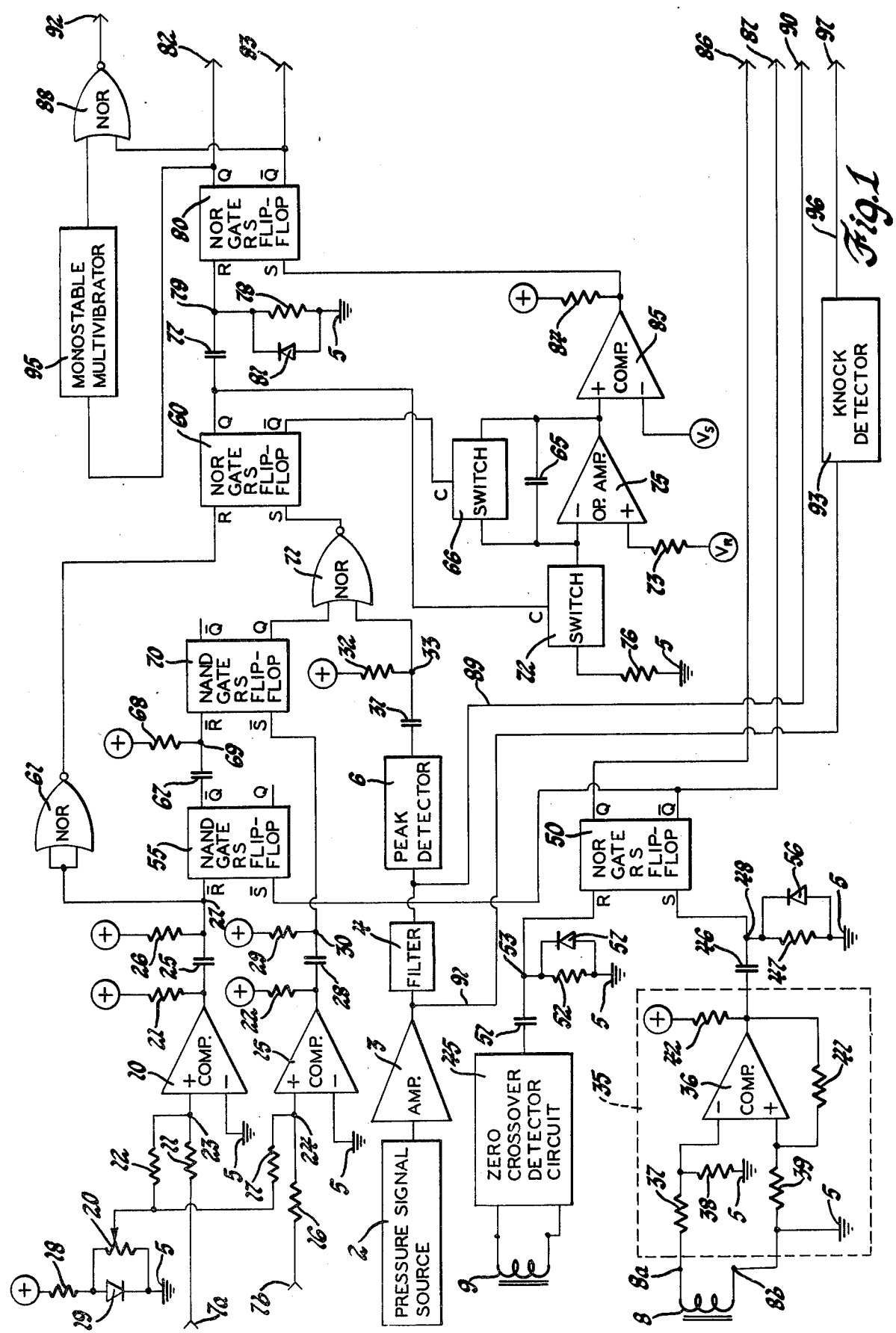

One embodiment of the peak cylinder combustion pressure ignition spark timing system of this invention is set forth partially in schematic and partially in block form in FIGS. 1 through 4, inclusive, of the drawing.

Briefly, the ignition spark timing system of this invention operates to time the ignition spark events of a spark ignited internal combustion engine in a manner to achieve peak cylinder combustion pressure at a predetermined constant engine crankshaft angle relative to piston top dead center at which peak cylinder combustion pressure is desired to occur, hereinafter referred to as the, "predetermined desired engine crankshaft angle". Input signals to the ignition spark timing system of this invention include but are not necessarily limited to a signal coincident with the occurrence of each peak cylinder combustion pressure within a selected monitored engine cylinder; a signal coincident with each spark event of the monitored engine cylinder; a signal coincident with each spark event of the engine cylinder fired next after the monitored engine cylinder; a signal preferably coincident with the top dead center position of the piston of the monitored engine cylinder and a signal coincident with a predetermined engine crankshaft angle having a fixed relation to the predetermined desired engine crankshaft angle. It is not absolutely necessary to the proper operation of the ignition spark timing system of this invention that the input signal described above as preferably coincident with the top dead center position of the piston of the monitored engine cylinder occurs precisely at this top dead center position. This signal may be produced within a crankshaft angle range encompassing the monitored engine cylinder piston top dead center position. As this signal is produced precisely at the monitored engine cylinder piston top dead center position in an actual embodiment, it will be hereinafter treated as occurring at this top dead center position.

The ignition spark timing system of this invention may be used in combination with a spark ignited internal combustion engine and an associated transistor ignition system having an ignition coil primary winding switching transistor. In the interest of reducing drawing complexity, and since internal combustion engines are old and well-known in the art and, per se, form no part of this invention, the engine has not been shown in the drawing. One example, and without intention or inference of a limitation thereto, of an internal combustion engine transistor ignition system suitable for use with the ignition spark timing system of this invention is disclosed and described in U.S. Pat. No. 3,605,713, LeMasters et al., which issued Sept. 20, 1971, and is assigned to the same assignee as is this invention.

Conventional NOR gate and NAND gate circuits, electronic bilateral switch circuits, voltage comparator circuits and operational amplifier circuits may be employed to practice this invention. As these circuit elements are commercially available items well-known in the art and, per se, form no part of this invention, each has been illustrated in block form in the drawing. In an actual embodiment, the NOR gate circuits, NAND gate circuits and electronic bilateral switch circuits employed are commercially available devices marketed by RCA Corporation under the respective designations CD 4001, CD 4011 and CD 4066 and the voltage comparator circuits and operational amplifier circuits employed are commercially available circuit elements marketed by the National Semiconductor Corporation under the respective designations LM 2901 and LM 2902. Furthermore, these devices are only examples of circuit elements suitable for use with the circuit of this invention, consequently, there is no intention or inference of a limitation thereto as other circuitry and elements having similar electrical characteristics may be substituted therefor without departing from the spirit of the invention.

In accordance with logic terminology well-known in the art, throughut this specification the logic signals will be referred to as "high" or logic 1 and "low" or logic 0 signals. For purposes of this specification, and without intention or inference of a limitation thereto, the "high" or logic 1 signals will be considered to be of a positive polarity potential and the "low" or logic 0 signals will be considered to be of zero or ground potential.

As point of reference or ground potential is the same point electrically throughout the system, it is illustrated in the drawing by the accepted schematic symbol and is referenced by the number 5.

In the interest of reducing drawing complexity, specific operating potential connections to the various circuit elements have not been shown in the drawing. It is to be specifically understood, however, that each is supplied with its rated operating potential, for example, 10 volts direct current. In those instances in which the application of the operating potential is important to the description of the invention, the positive polarity output terminal of the operating potential source is illustrated by a plus sign within a circle.

In an actual embodiment, to produce the input signals coincident with the peak cylinder combustion pressure of the monitored engine cylinder, a force ring of the piezoelectric type, a charge amplifier circuit and a peak location detector circuit are employed. The force ring, which may be firmly secured to the engine by a cylinder head bolt tightened to rated torque, serves as a cylinder combustion pressure signal source. Examples of a commercially available force ring and a charge amplifier circuit suitable for use with the ignition spark timing system of this invention are those marketed by PCB Piezotronics, Inc. of Buffalo, New York and are identified as the Model 213A quartz force ring and the Model 462A Charge Amplifier. The force ring-charge amplifier circuit combination produces an output signal of a potential magnitude proportional to cylinder combustion pressure change. In FIG. 1, the force ring pressure signal source and the charge amplifier circuit are indicated in block form and are referenced by the numerals 2 and 3, respectively. The output signal of charge amplifier circuit 3 is applied through a conventional low pass filter circuit 4 to the input terminal of a peak location detector circuit 6. A peak location detector circuit suitable for use with the ignition spark timing system of this invention is set forth in schematic form in FIG. 14 and is described in detail later in this specification. In the actual embodiment, the peak location detector circuit employed produces a logic 0 output signal upon detecting a maximum or peak pressure signal source output signal.

To provide the respective input signals coincident with the spark events of the monitored and the next fired engine cylinders, the spark plug of the monitored engine cylinder is electrically connected to input terminal 7a and the spark plug of the cylinder which is fired next after the monitored engine cylinder during the firing order sequence is electrically connected to input terminal 7b.

To provide the input signal preferably coincident with the top dead center position of the piston of the monitored engine cylinder and the input signal coincident with the predetermined crankshaft angle having a fixed relation to the predetermined desired engine crankshaft angle, a permanent magnet may be mounted upon any selected part of the engine that is rotated in timed relationship with the engine crankshaft such as the flywheel or the dynamic balancer which is normally located at the front of the engine and is rotated by the engine crankshaft. A pickup coil 8 is securely mounted upon the engine at the location at which it is in magnetic flux linking relationship with the rotating permanent magnet at the top dead center position of the piston of the monitored engine cylinder and another pickup coil 9 is mounted upon the engine at the location at which it is in magnetic flux linking relationship with the rotating permanent magnet at the predetermined crankshaft angle having a fixed relation to the predetermined desired engine crankshaft angle. Pickup coil 9 may be mounted upon the engine in a manner to provide for the adjustment thereof relative to engine crankshaft angle, if desirable. As this expedient is well known in the art, it is not shown in detail in the drawing. The reason for the predetermined crankshaft angle having a fixed relation to the predetermined desired engine crankshaft angle will be brought out later in this specification.

Figure 3:
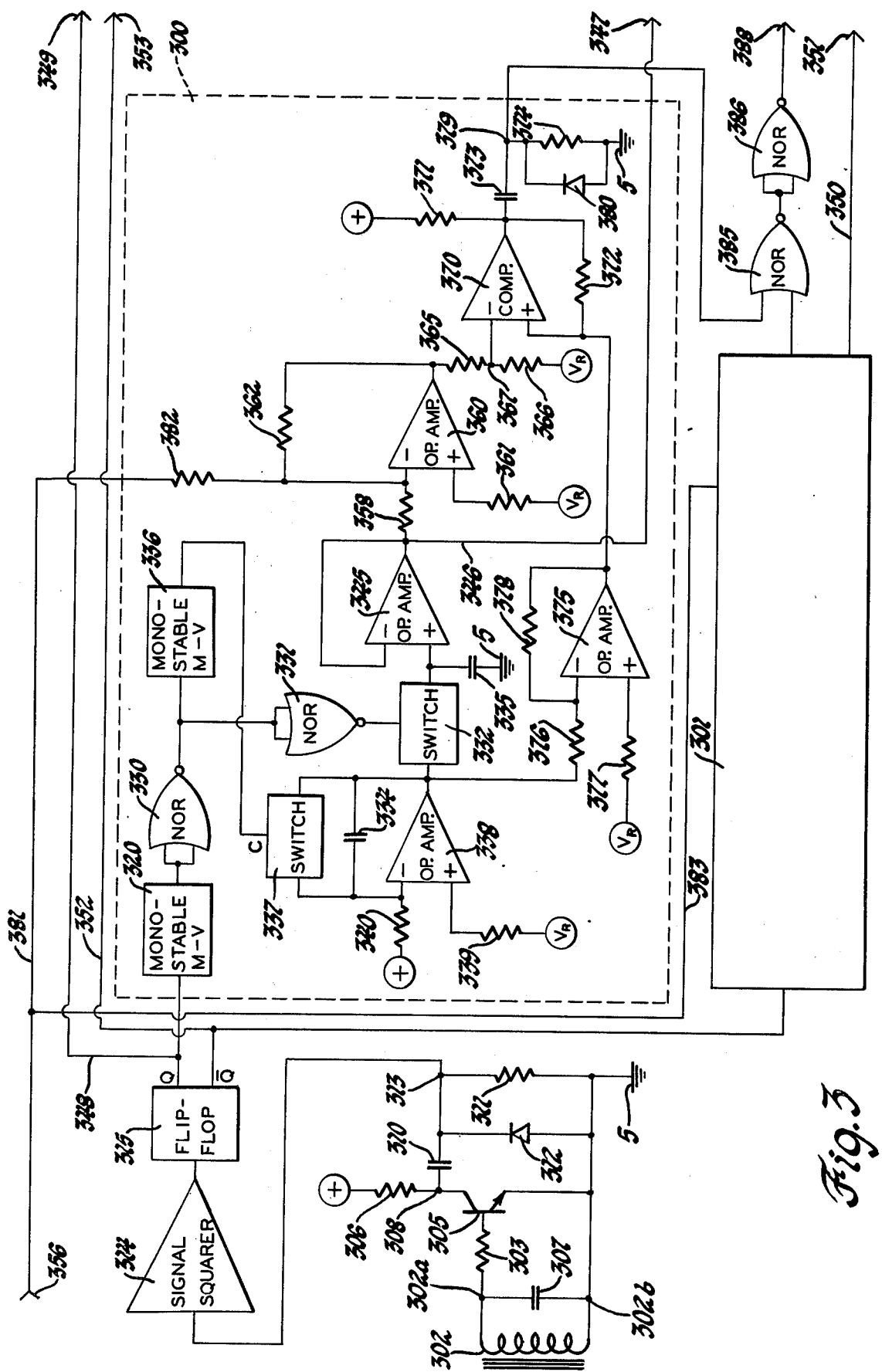

In addition to the input signals hereinabove set forth, an engine speed signal $V_s$ of a direct current potential magnitude inversely proportional to engine speed is generated by the circuitry set forth in FIGS. 3 and 4 of the drawing. In FIG. 3, a portion of the circuitry is shown to be enclosed within a dashed rectangle 300. As the circuitry of FIG. 3 is made up of two identical channels, in the interest of reducing drawing complexity, the circuitry of one of the channels is shown in detail within dashed rectangle 300 and the identical circuitry of the other channel is represented in the form of a block 301.

Briefly, to produce the engine speed signal $V_s$, an engine speed integrator circuit of conventional design is included in each of the channels. Each engine speed integrator circuit produces a negative going direct current potential ramp signal which ramps down substantially linearly from a predetermined positive polarity direct current reference potential at a predetermined rate with time over 180 crankshaft degrees. In an actual embodiment, a reference potential source which supplies a substantially constant positive polarity direct current reference potential of a magnitude of five volts is employed. In the drawing, all circuit points to which this reference potential is applied are indicated as $V_R$ within a circle.

The engine speed integrator circuit of the channel set forth within dashed rectangle 300 is enabled for 180 engine crankshaft degrees and the engine speed integrator circuit included in the circuitry represented by block 301 is enabled for another 180 engine crankshaft degrees, the respective periods of enablement being phase displaced by 90 engine crankshaft degrees. The engine speed integrator circuits of the two channels of the circuitry of FIG. 3, therefore, produce respective direct current negative ramp signals phase displaced from each other by 90 engine crankshaft degrees as illustrated by curves G and H of FIG. 6. In an actual embodiment, the two engine speed integrator circuits are designed to provide a negative going direct current potential ramp signal which ramps toward ground from the positive polarity five volts direct current reference potential $V_R$ at a substantially constant rate of $-50$ volts per second.

Figure 6:
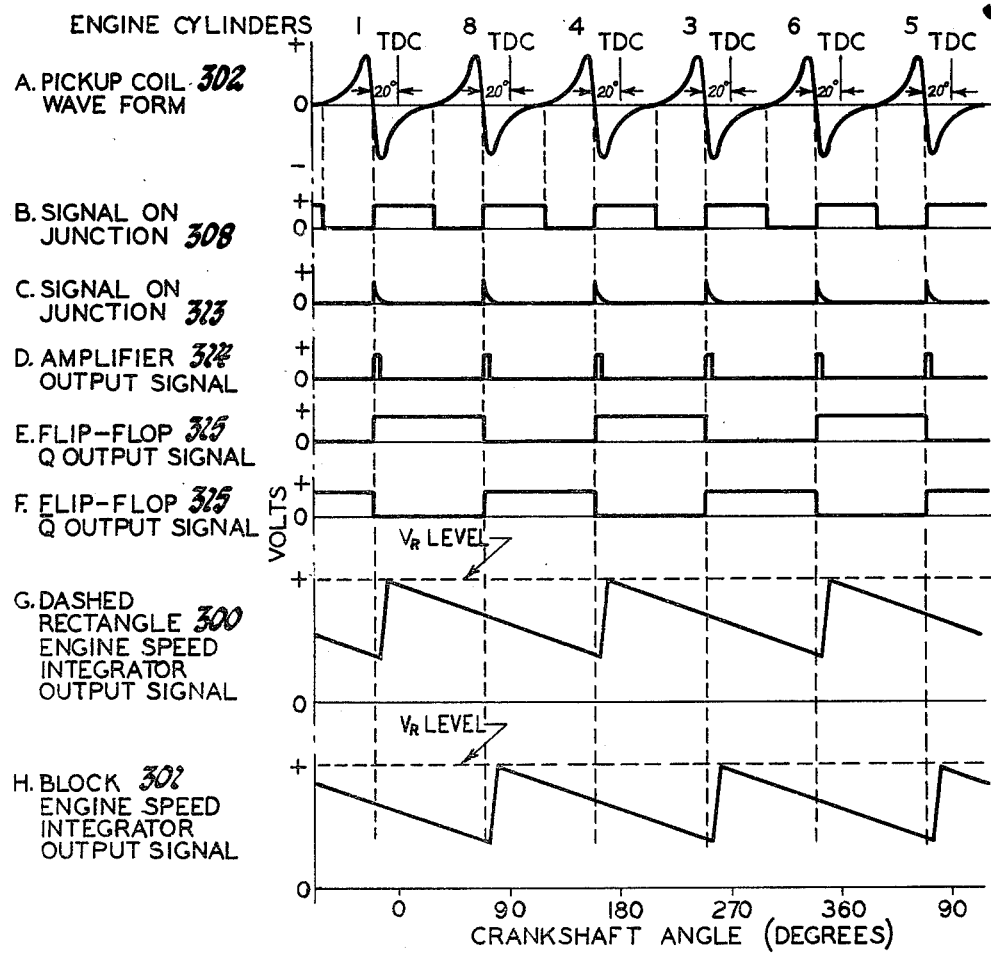

For proper operation, it is necessary that a series of signals referenced to engine crankshaft position be provided. In an actual embodiment, these signals are produced by a conventional automotive type magnetic pickup distributor well-known in the art. One example of a magnetic pickup distributor well-known in the automotive art suitable for use with the timing system of this invention is of the variable reluctance type disclosed and described in U.S. Pat. No. 3,254,247, Falge, which issued May 31, 1966 and is assigned to the same assignee as is this invention. In the interest of reducing drawing complexity, the variable reluctance type ignition distributor disclosed and described in the aforementioned patent is not shown. In ignition distributors of this type, magnetic flux is provided by a permanent magnet and a rotor member is rotated in timed relationship with the engine by the engine in a manner well-known in the automotive art within the bore of a pole piece, both of which are in the same magnetic circuit. Equally spaced about the outer periphery of the rotor and about the internal bore of the pole piece are a series of projections equal in number to the number of cylinders of the engine with which the distributor is being used. As each rotor projection approaches a pole piece projection, the reluctance of the magnetic circuit between the rotor and pole piece decreases and as each rotor projection moves away from a pole piece projection, the reluctance of the magnetic circuit between the rotor and pole piece increases. Consequently, the magnetic field produced by the permanent magnet increases and decreases as each rotor projection approaches and passes a pole piece projection, a condition which induces an alternating current signal in an associated pickup coil magnetically coupled to the pole piece. In FIG. 3, the ignition distributor pickup coil is referenced by the numeral 302. With this type magnetic pickup ignition distributor, as the rotor is rotated in timed relationship with and by the engine within the bore of the associated pole piece, an alternating current signal wave-form as illustrated by curve A of FIG. 6 is induced in magnetic pickup coil 302. The magnetic pickup type distributor is so adjusted that each positive to negative polarity zero crossover point of the induced alternating current signal wave-form occurs at a predetermined engine crankshaft angle which may be top dead center or any other desirable engine crankshaft angle which may be convenient. In FIG. 6 of the drawing, the positive to negative polarity zero crossover points of the alternating current signal wave-form induced in pickup coil 302 are indicated to occur at 20 engine crankshaft degrees before the piston top dead center position.

Terminal end 302a of pickup coil 302 is connected through an input resistor 303 to the base electrode of an NPN transistor 305 and terminal end 302b thereof is connected to point of reference or ground potential 5 as is the emitter electrode of NPN transistor 305. The collector electrode of transistor 305 is connected to the positive polarity output terminal of the operating potential source through collector resistor 306. Capacitor 307 is the common filter capacitor well-known in the art. When the potential upon terminal end 302a of pickup coil 302 is of a positive polarity and of a sufficient magnitude to produce base-emitter drive current through NPN transistor 305, this device is triggered conductive through the collector-emitter electrodes and remains conductive until the potential upon terminal end 302a of pickup coil 302 falls to substantially zero. The signal upon junction 308, therefore, translates from substantially ground potential to a positive polarity potential substantially equal to the supply potential at each positive to negative zero crossover point of the waveform induced in pickup coil 302 as illustrated by curve B of FIG. 6. This positive going signal is differentiated by the capacitor 310-resistor 311 combination to a logic 1 potential spike upon junction 313 at each positive to negative zero crossover point of the induced alternating current wave-form, as illustrated by curve C of FIG. 6. Diode 312 diverts the negative polarity spike of this differentiated signal to point of reference or ground potential 5.

The logic 1 signal spikes upon junction 313 are applied to the input terminal of a conventional signal squaring amplifier circuit 314 which may be a commercially available circuit element marketed by the RCA Corporation under the designation CD 4050. Squaring amplifier circuit 314 converts these logic 1 signal spikes to a square wave-form logic 1 signals, as illustrated by curve D of FIG. 6, which are applied to the input terminal of a conventional single input type flip-flop circuit 315 which may be a commercially available item marketed by the RCA Corporation under the designation CD 4027. Flip-flop circuits of this type may be successively switched to alternate states by positive going input wave fronts. Consequently, the positive going leading edges of the logic 1 signal pulses produced by squaring amplifier circuit 314 every 90 engine crankshaft degrees trigger flip-flop circuit 315 to alternate stable states. Opposite polarity logic signals appear upon the Q and $\overline{Q}$ output terminals of flip-flop circuit 315 while in each stable state. The output signal waveforms appearing upon the Q and $\overline{Q}$ output terminals of flip-flop circuit 315 are illustrated by respective curves E and F of FIG. 6. With this arrangement a positive going signal appears upon the Q output terminal of flip-flop circuit 315 every 180 engine crankshaft degrees and a positive going signal displaced 90 engine crankshaft degrees from those upon the Q output terminal appear upon the $\overline{Q}$ output terminal of flip-flop circuit 315 every 180 engine crankshaft degrees.

Figure 12:
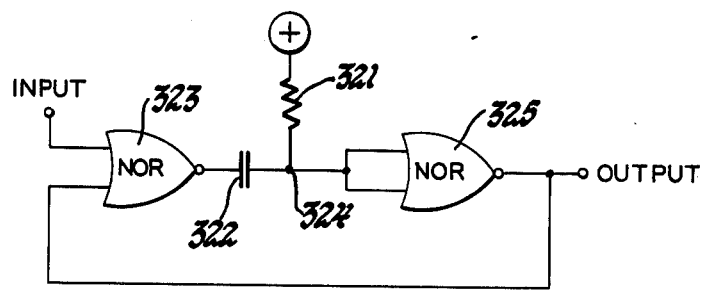
FIG. 12 is a schematic circuit for a monostable multivibrator circuit suitable for use with the ignition spark timing system of this invention.

As the signal channels within dashed rectangle 300 and within block 301 are identical and operate in an identical manner, only the signal channel detailed within dashed rectangle 300 will be described in detail. The logic signals appearing upon the Q output terminal of flip-flop circuit 315 are directed to the input terminal of a conventional commercially available monostable multivibrator circuit 320 of a type which is triggerable to the alternate state upon the application of a logic 1 input signal. One example of a monostable multivibrator circuit of this type which may be employed with the circuit of this invention is set forth in detail in FIG. 12. Timing potential is supplied from the positive polarity output terminal of the operating potential source through resistor 321. In the initial quiescent state, input equals zero, capacitor 322 is completely discharged. Upon the application of a logic 1 signal to the uncommitted input terminal of NOR gate 323, a logic 0 appears upon the output terminal thereof and capacitor 322 begins to charge through resistor 321. Upon the initial appearance of the logic 0 signal upon the output terminal of NOR gate 323, a logic 0 signal appears upon junction 324 which is inverted by NOR gate 325 to a logic 1 output signal. The output remains a logic 1 signal until the voltage across capacitor 322, in charging through resistor 321, passes the threshold value of the output inverter 325. At this time, the output signal translates to a logic 0. Upon the translation of the output signal to a logic 0, capacitor 322 discharges completely through resistor 321 to prepare the circuit for the next logic 1 input trigger pulse.

Each positive going leading edge of the signals upon the Q output terminal of flip-flop circuit 315, which occur every 180 engine crankshaft degrees, triggers monostable multivibrator circuit 320 to its alternate state in which a logic 1 signal is present upon the output terminal thereof. This logic 1 output signal is inverted to a logic 0 signal by conventional two input NOR gate 330. The logic 0 output signal of NOR gate 330 is inverted and squared by conventional two input NOR gate 331 to a logic 1 signal which is applied to the control "C" input terminal of conventional electronic bilateral switch 332 to trigger this device conductive. Bilateral switches of this type are not conductive with a logic 0 signal applied to the control "C" input terminal thereof and are triggered conductive upon the application of a logic 1 signal to the control "C" input terminal thereof. Conducting bilateral switch 332 transfers the charge upon integrator capacitor 334 to holding capacitor 335. When monostable multivibrator circuit 320 has timed out in a matter of a few microseconds, this device spontaneously returns to its initial quiescent state in which a logic 0 signal is present upon the output terminal thereof. This logic 0 signal is inverted and squared by conventional two input NOR gate 330 to a logic 1 signal which is applied to the input terminal of monostable multivibrator circuit 336 which may be identical to monostable multivibrator circuit 320 and is inverted to a logic 0 signal by NOR gate 331 which disables bilateral switch 332. Upon the application of this logic 1 input signal, monostable multivibrator circuit 336 is triggered to the alternate state in which a logic 1 signal is present upon the output terminal thereof. This logic 1 signal is applied to the control "C" input terminal of conventional bilateral electronic switch 337 to trigger this device conductive. Conducting bilateral electronic switch 337 completely discharges integrator capacitor 334. When monostable multivibrator circuit 336 has timed out in a matter of a few microseconds, it spontaneously reverts to the original quiescent state in which a logic 0 signal is present upon the output terminal thereof. This logic 0 signal disables bilateral switch 337, consequently, integrator capacitor 334 is reset in preparation for the next engine speed signal integration cycle.

Figure 7:
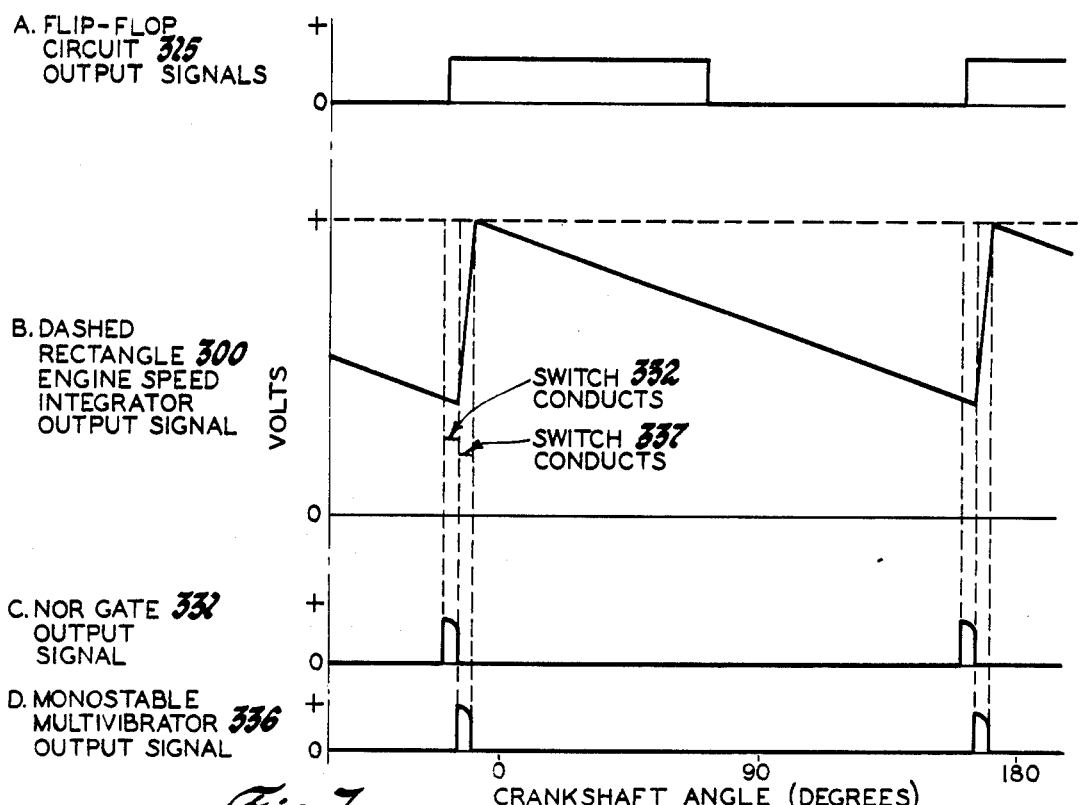

This time sequence is more clearly shown by the curves of FIG. 7, which is a portion of FIG. 6 on an expanded scale, wherein the output signal upon the Q output terminal of flip-flop circuit 315 is illustrated by curve A. During the time monostable multivibrator circuit 320 is in the alternate state, NOR gate 331 produces a logic 1 output signal, curve C, which triggers bilateral switch 332 conductive. Upon the conduction of bilateral switch 332, the charge upon integrator capacitor 334 is transferred to holding capacitor 335 through conducting bilateral switch 332. At the conclusion of the time out period, monostable multivibrator circuit 320 spontaneously returns to the initial quiescent state in which a logic 0 signal is present upon the output terminal. This logic 0 signal is inverted by NOR gate 330 to a logic 1 signal which triggers monostable multivibrator circuit 336 to the alternate state. During the time monostable multivibrator circuit 336 is in the alternate state, the logic 1 output signal thereof, curve D, triggers bilateral switch 337 conductive. Upon the conduction of bilateral switch 337, integrator capacitor 334 is completely discharged. At the conclusion of the time out period, monostable multivibrator circuit 336 spontaneously reverts to the initial quiescent state to terminate the logic 1 output signal thereof and integrator capacitor 334 is in the Reset condition in preparation for another integration cycle. The corresponding identical circuitry of block 301 operates through this same sequence in an identical manner in response to each positive going leading edge of the signals upon the $\overline{Q}$ output terminal of flip-flop circuit 315.

The non-inverting input terminal of operational amplifier circuit 338 of the engine speed integrator circuit within dashed rectangle 300 is connected through an input resistor 339 to the previously described source of reference potential $V_R$ and the inverting input terminal thereof is connected through an input resistor 340 to the positive polarity output terminal of the operating potential source. As the inverting input terminal of operational amplifier circuit 338 is connected to the source of operating potential, upon the return of monostable multivibrator circuit 336 to the stable state to remove the logic 1 output signal thereof from bilateral switch 337, the engine speed integrator circuit begins to produce a negative going direct current potential ramp signal which ramps in a negative polarity direction from the positive polarity magnitude of the reference potential $V_R$ at a substantially constant rate with time as previously described, curve G of FIG. 6 and curve B of FIG. 7. Simultaneously, the charge upon holding capacitor 335, the potential charge upon integrator capacitor 334 at the conclusion of the previous engine speed signal integration cycle of this engine speed integrator circuit, is impressed upon the non-inverting input terminal of conventional operating amplifier circuit 345 which, with the output terminal connected directly to the inverting input terminal, is a high impedance buffer amplifier circuit which isolates holding capacitor 335 from the remainder of the circuit. In an actual embodiment, this buffer amplifier circuit was designed for unity gain, consequently, the output potential thereof is substantially equal to the charge upon holding capacitor 335. The output potential of buffer amplifier circuit 345 is applied through lead 346 and circuit point 347 of FIG. 3 and circuit point 400 and input resistor 401 of FIG. 4 to the inverting input terminal of conventional operational amplifier circuit 405, the non-invering input terminal of which is connected through input resistor 406 to the previously described source of reference potential $V_R$. As the output terminal of operational amplifier circuit 405 is connected to the inverting input terminal through feedback resistor 407 and the output potential of buffer amplifier circuit 345 is applied to the inverting input terminal thereof, the circuitry including operational amplifier circuit 405, input resistors 401 and 406 and feedback resistor 407 comprise a conventional inverting amplifier circuit which produces an output positive polarity engine speed signal $V_s$ of a direct current potential magnitude inversely proportional to engine speed. During this period of time, the logic 1 output signal upon the $\overline{Q}$ output terminal of flip-flop circuit 315, FIG. 3, is also impressed through lead 348 and circuit point 349 of FIG. 3 and circuit point 408 and lead 409 of FIG. 4 to the control "C" input terminal of conventional bilateral switch 410. This logic 1 signal triggers bilateral switch 410 conductive, consequently, the engine speed signal $V_s$ upon the output terminal of operational amplifier circuit 405 appears upon junction 411 from which it is applied to all points of the circuit labeled $V_s$ within a circle.

As has been previously brought out, the circuitry included within block 301 of FIG. 3 operates in an identical manner for 180 engine crankshaft degrees displaced from that hereinabove described by 90 engine crankshaft degrees. Upon the return of the monostable multivibrator circuit of block 301 corresponding to monostable multivibrator circuit 336 of block 300 to the stable state, the engine speed integrator circuit within block 301 begins to produce a negative going direct current potential ramp signal which ramps in a negative polarity direction from the positive polarity magnitude of the reference potential $V_R$ at a substantially constant rate with time, as set forth in curve H of FIG. 6. The output potential of the buffer amplifier circuit of block 301 comparable to the buffer amplifier circuit 345 hereinabove described is applied through lead 350 and circuit point 351 of FIG. 3 and circuit point 413 and input resistor 414 of FIG. 4 to the inverting input terminal of conventional operational amplifier circuit 415, the non-inverting input terminal of which is connected through resistor 416 to the previously described source of reference potential $V_R$. As the output terminal of operational amplifier circuit 415 is connected to the inverting input terminal through feedback resistor 417 and the output potential of the buffer amplifier circuit of block 301 comparable to buffer amplifier circuit 345 is applied to the inverting input terminal thereof, the circuitry including operational amplifier circuit 415, input resistor 414 and 416 and feedback resistor 417 comprise a conventional inverting amplifier circuit which produces an output positive polarity engine speed signal $V_s$ of a direct current potential magnitude inversely proportional to engine speed. During this period of time, the logic 1 output signal upon the $\overline{Q}$ output terminal of flip-flop circuit 315, FIG. 3, is also impressed through lead 352 and circuit point 353 of FIG. 3 and circuit point 420 and lead 421 of FIG. 4 to the control "C" input terminal of conventional bilateral switch 425. This logic 1 signal triggers bilateral switch 425 conductive, consequently, the engine speed signal $V_s$ upon the output terminal of operational amplifier circuit 415 appears upon junction 411 from which it is applied to all points of the circuit labeled $V_s$ within a circle.

Figure 4:
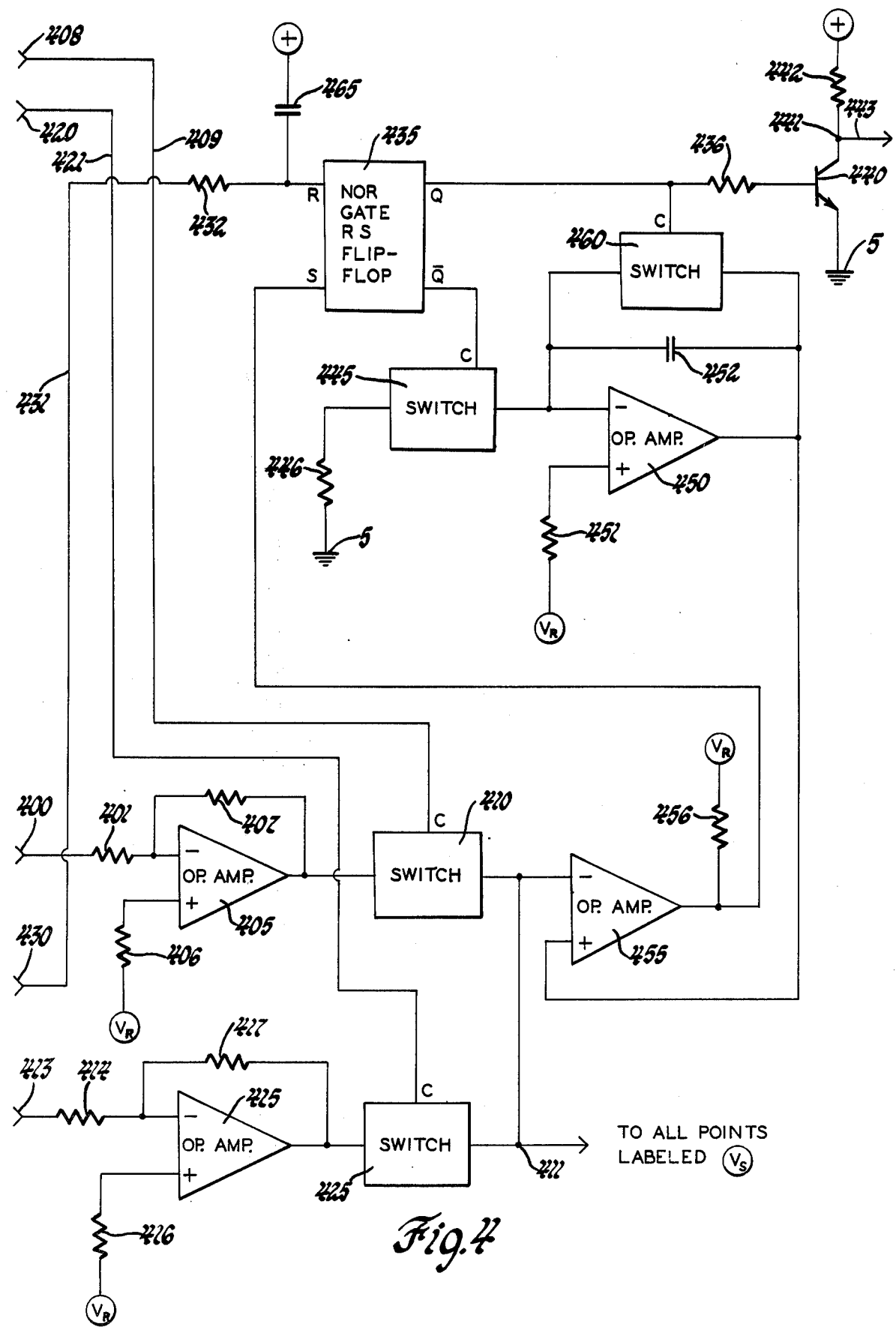

From this description of the operation of the circuitry of FIGS. 3 and 4, it is apparent that the engine speed signal $V_s$ is updated every ninety engine crankshaft degrees.

In an actual embodiment, the No. 1 cylinder of a V-8 internal combustion gasoline engine is selected as the monitored engine cylinder. Therefore, the No. 1 engine cylinder spark plug is electrically connected to input terminal 7a and the No. 8 engine cylinder spark plug is electrically connected to input terminal 7b as the No. 8 engine cylinder spark plug is the spark plug fired next after the No. 1 engine cylinder spark plug in the 8-cylinder engine firing order 1—8—4—3—6—5—7—2. Any other engine cylinder may be selected as the monitored engine cylinder without departing from the spirit of the invention, however, it has been demonstrated that a corner cylinder provides the highest amplitude pressure signal.

Input terminal 7a is connected through input resistor 11 to the non-inverting input terminal of conventional voltage comparator circuit 10, the inverting input terminal of which is connected to point of reference or ground potential 5. Input terminal 7b is connected through input resistor 16 to the non-inverting input terminal of conventional voltage comparator circuit 15, the inverting input terminal of which is connected to point of reference or ground potential 5. To maintain a logic 1 signal upon the output terminal of each of comparator circuits 10 and 15 in the absence of an input signal upon respective input terminals 7a and 7b, a substantially constant positive polarity bias signal is provided by resistor 18 and diode 19 which is applied through the movable contact of a conventional potentiometer circuit 20 to the non-inverting input terminals of comparator circuits 10 and 15 through respective input resistors 12 and 17. Diode 19 maintains the pickup point slightly above ground potential. As the output device of each of the type LM 2901 voltage comparator circuits employed in the actual embodiment is the uncommitted collector electrode of a grounded emitter NPN transistor, resistors 21 and 22 are pull-up resistors for respective voltage comparator circuits 10 and 15.

As the spark plugs of spark ignited internal combustion engines are fired by an ignition spark creating potential of a negative polarity with respect to point of reference or ground potential, voltage comparator circuit 10 produces a logic 0 output signal when the ignition spark creating potential applied to the No. 1 engine cylinder spark plug pulls the signal upon junction 23 below ground potential and voltage comparator circuit 15 produces a logic 0 output signal when the ignition spark creating potential applied to the No. 8 engine cylinder spark plug pulls the signal upon junction 24 below ground potential. The logic 0 output signal of voltage comparator circuit 10 is differentiated by the capacitor 25-resistor 26 combination into a negative polarity voltage spike upon junction 27 every 720 mechanical degrees of engine crankshaft rotation as is illustrated by curve A of FIG. 5. The logic 0 output signal of voltage comparator circuit 15 is differentiated by the capacitor 28 -resistor 29 combination into a negative polarity voltage spike upon junction 30 every 720 mechanical degrees of engine crankshaft rotation as is illustrated by curve B of FIG. 5.

Upon the firing of each cylinder of the associated internal combustion engine, a pressure signal is produced by the force ring 2-charge amplifier circuit 3 combination and is applied through filter circuit 4 to the input terminal of peak location detector 6. Consequently, upon the occurrence of a peak cylinder combustion pressure for every cylinder of the associated internal combustion engine, peak detector 6 produces a logic 0 output signal which is differentiated by the capacitor 31-resistor 32 combination into a negative polarity voltage spike upon junction 33 every 90 mechanical degrees of engine crankshaft rotation as is illustrated by curve C of FIG. 5.

Pickup coil 8 is connected across the input terminals of a conventional zero crossover detector circuit 35 which includes conventional voltage comparator circuit 36. Pickup coil 8 is so poled that, as the rotating magnet previously described is passed through magnetic flux linking engagement therewith, the alternating current wave-form induced therein is initially of a positive going polarity upon terminal end 8a thereof with respect to terminal end 8b which is maintained at ground potential. The potential upon terminal 8a with respect to point of reference or ground potential 5 is applied across a voltage divider network comprising resistors 37 and 38. The junction between resistors 37 and 38 and ground potential via input resistor 39 are connected to the inverting input terminal and the non-inverting input terminal, respectively, of voltage comparator circuit 36. Consequently, when the potential upon terminal end 8a of pickup coil 8 becomes more positive than the potential signal applied to the non-inverting input terminal thereof, comparator circuit 36 produces a logic 0 output signal which is fed back to the non-inverting input terminal thereof through feedback resistor 41 which provides hysteresis for maintaining the output signal a logic 0. When the potential upon terminal end 8a of pickup coil 8 passes through zero from a positive to a negative polarity direction, the output signal of comparator circuit 36 switches from a logic 0 to a logic 1. This logic 1 output signal is fed back to the non-inverting input terminal of comparator circuit 36 through feedback resistor 41 to maintain this logic 1 output signal until the next time the signal waveform induced in pickup coil 8 is of a positive polarity upon terminal end 8a thereof to switch the output signal of comparator circuit 36 from a logic 1 to a logic 0 as previously described. Pickup coil 8, therefore, is located at a position at which the alternating current potential waveform induced therein crosses zero from a positive to a negative polarity direction at the top dead center position of the piston of the monitored engine cylinder. Resistor 42 is the comparator circuit 36 pull-up resistor previously described.

The output signal of pickup coil 9 is applied to another zero crossover detector circuit 45 of a type which may be identical to zero crossover detector circuit 35 previously described. Therefore, in the interest of reducing drawing complexity, zero crossover detector circuit 45 is represented in block form. When the alternating current signal wave-form induced in pickup coil 9 crosses zero from a positive to a negative polarity direction, zero crossover detector circuit 45 produces a logic 1 output signal in a manner previously described with regard to zero crossover detector circuit 35. Pickup coil 9, therefore, is located at a position at which the alternating current potential wave-form induced therein crosses zero from a positive to a negative polarity direction at the predetermined crankshaft angle having a fixed relation to the predetermined desired engine crankshaft angle.

The logic 1 output signal produced by zero crossover detector circuit 35 is differentiated by the capacitor 46-resistor 47 combination to a positive polarity potential spike upon junction 48 which is applied to the S "Set" input terminal of a conventional NOR gate RS flip-flop circuit 50 and the logic 1 output signal produced by zero crossover detector circuit 45 is differentiated by the capacitor 51-resistor 52 combination to a positive polarity potential spike upon junction 53 which is applied to the R "Reset" input terminal of NOR gate RS flip-flop circuit 50. Diodes 56 and 57 bypass the negative going spikes of these differentiated signals to point of reference or ground potential 5. The NOR gate RS flip-flop circuit is a conventional logic circuit element well-known in the art which, upon the application of a logic 1 signal to the S "Set" input terminal, is triggered to the "Set" condition in which it produces a logic 0 signal upon the $\overline{Q}$ output terminal and a logic 1 signal upon the Q output terminal and which, upon the application of a logic 1 signal to the R "Reset" input terminal, is triggered to the "Reset" condition in which it produces a logic 0 signal upon the Q output terminal and a logic 1 signal upon the $\overline{Q}$ output terminal.

As has been previously explained, an alternating current wave-form signal which goes through zero from a positive to a negative polarity at the top dead center position of the piston of the monitored engine cylinder is induced in pickup 8 and an alternating current wave-form signal which goes through zero from a positive to a negative polarity at the predetermined engine crankshaft angle having a fixed relation to the predetermined desired engine crankshaft angle is induced in pickup coil 9. In an actual embodiment, the permanent magnet passed by and in magnetic flux linking relationship with pickup coils 8 and 9 is rotated at engine crankshaft speed. Consequently, the alternating current wave-form signals are induced in each of pickup coils 8 and 9 once every engine crankshaft revolution. The output signals produced by zero crossover detector circuit 35 in response to the alternating current wave-form signals induced in pickup coil 8 and differentiated to logic 1 signal spikes upon junction 48 and the output signals produced by zero crossover detector circuit 45 in response to the alternating current wave-form signals induced in pickup coil 9 and differentiated to logic 1 signal spikes upon junction 53, as previously explained, will hereinafter be referred to as top dead center signals and Beta signals, respectively. The logic 1 signal spikes upon junction 48 trigger RS flip-flop circuit 50 to the "Set" condition in which a logic 1 output signal is present upon the Q output terminal and a logic 0 signal is present upon the $\overline{Q}$ output terminal. The logic 1 signal spikes upon junction 53 trigger RS flip-flop circuit 50 to the "Reset" condition in which a logic 0 output signal is present upon the Q output terminal and a logic 1 output signal is present upon the $\overline{Q}$ output terminal. The output signal wave-form appearing upon the Q output terminal of RS flip-flop circuit 50 is illustrated by curve D of FIG. 5 and the output signal wave-form appearing upon the $\overline{Q}$ output terminal of RS flip-flop circuit 50 is illustrated by curve E of FIG. 5. An inspection of these wave-forms indicates that RS flip-flop circuit 50 produces two output signals of opposite polarity and that the polarity of both is reversed in response to each alternating current wave form induced in pickup coil 8 and in response to each alternating current wave form induced in pickup coil 9.

Junction 27 and the $\overline{Q}$ output terminal of RS flip-flop circuit 50 are connected, respectively, to the $\overline{R}$ "Reset" input terminal and to the $\overline{S}$ "Set" input terminal of a conventional NAND gate RS flip-flop circuit 55. The NAND gate RS flip-flop circuit is a conventional logic circuit element well-known in the art which, upon the application of a logic 0 signal to the $\overline{S}$ "Set" input terminal is triggered to the "Set" condition in which it produces a logic 1 signal upon the Q and a logic 0 signal upon the $\overline{Q}$ output terminal and which, upon the application of a logic 0 signal to the $\overline{R}$ "Reset" input terminal is triggered to the "Reset" condition in which it produces a logic 1 signal upon the $\overline{Q}$ output terminal and a logic 0 signal upon the Q output terminal.

Upon the occurrence of a No. 1 engine cylinder firing event, a negative going potential spike appears upon junction 27 as has been previously explained. This logic 0 signal triggers NAND gate RS flip-flop circuit 55 to the "Reset" condition in which a logic 1 signal is present upon the $\overline{Q}$ output terminal, curve F of FIG. 5, and is inverted to a logic 1 signal by a conventional two input NOR gate 61.

Figure 5:
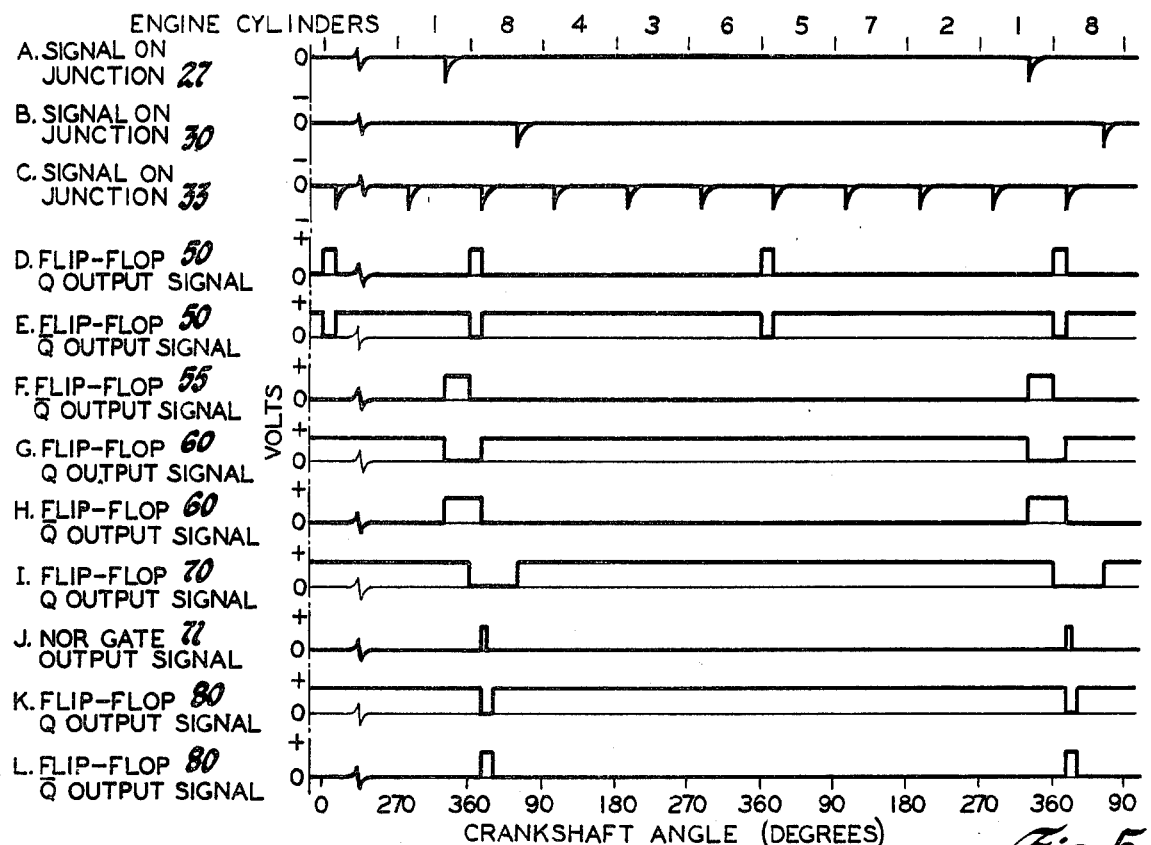
FIGS. 5 through 11 are curves useful in understanding the operation of the circuitry of FIGS. 1 through 4.

The NOR gate 61 logic 1 output signal is applied to the R "Reset" input terminal of a conventional NOR gate RS flip-flop circuit 60 to trigger this device to the "Reset" condition in which a logic 0 signal is present upon the Q output terminal and a logic 1 signal upon the $\overline{Q}$ output terminal, as illustrated by respective curves G and H of FIG. 5. The logic 1 signal upon the $\overline{Q}$ output terminal of RS flip-flop circuit 60 is applied to the control "C" input terminal of conventional electronic bilateral switch 66 to trigger this device conductive to discharge integrator capacitor 65.

Upon the occurrence of the next logic 1 top dead center signal upon junction 48, the number of engine crankshaft degrees after the engine cylinder No. 1 firing event equal to the current ignition spark advance, NOR gate RS flip-flop circuit 50 is triggered thereby to the "Set" condition in which a logic 0 signal is present upon the $\overline{Q}$ output terminal, curve E of FIG. 5. This logic 0 signal triggers NAND gate RS flip-flop circuit 55 to the "Set" condition in which a logic 0 signal is present upon the $\overline{Q}$ output terminal thereof, curve F of FIG. 5. As NAND gate RS flip-flop circuit 55 is triggered to the "Reset" condition in response to a No. 1 engine cylinder firing event and to the "Set" condition in response to the next top dead center signal, NAND gate RS flip-flop circuit 55 produces a logic 1 output signal upon the $\overline{Q}$ output terminal every other engine crankshaft revolution which subsists for the period of time between the No. 1 engine cylinder firing event and the next top dead center signal, as illustrated by curve F of FIG. 5.

The logic 0 output signal upon the $\overline{Q}$ output terminal of RS flip-flop circuit 55 upon the triggering of this circuit to the "Set" condition in response to the top dead center signal is differentiated by the capacitor 67-resistor 68 combination to a logic 0 signal spike upon junction 69 which is applied to the $\overline{R}$ "Reset" input terminal of NAND gate RS flip-flop circuit 70. This logic 0 signal triggers RS flip-flop circuit 70 to the "Reset" condition in which a logic 0 signal is present upon the Q output terminal, curve I of FIG. 5, which is applied to one of the input terminals of a conventional two input NOR gate 71 to enable this device. RS flip-flop circuit 70 remains in the "Reset" condition until it is triggered to the "Set" condition in response to the logic 0 signal spike upon junction 30 upon the next firing event of engine cylinder No. 8.

When the No. 1 engine cylinder combustion pressure reaches a maximum or peak value at some crankshaft angle after piston top dead center, a logic 0 signal spike appears upon junction 33, as previously explained, which is applied to the other input terminal of the two input NOR gate 71. With a logic 0 signal present upon both input terminals, NOR gate 71 produces a logic 1 No. 1 engine cylinder peak cylinder combustion pressure output signal pulse, curve J of FIG. 5, which is applied to the S "Set" input terminal of NOR gate RS flip-flop circuit 60. This logic 1 No. 1 engine cylinder peak cylinder combustion pressure signal pulse triggers RS flip-flop circuit 60 to the "Set" condition in which a logic 1 signal is present upon the Q output terminal and a logic 0 signal is present upon the $\overline{Q}$ output terminal, curves G and H of FIG. 5.

Referring to curve C of FIG. 5, it is noted that a logic 0 peak cylinder combustion pressure signal pulse is produced every 90 engine crankshaft degrees, each corresponding to a different respective cylinder of an eight cylinder engine. Since only the peak cylinder combustion pressure signal corresponding to a single engine cylinder is desired, it is necessary that only this signal be detected and that all of the others be discarded. The logic 0 output signal, curve I, present upon the Q output terminal of RS flip-flop circuit 70 between the occurrence of the top dead center signal and the No. 8 engine cylinder firing signal, curve B, enables NOR gate 71 for this period only. Therefore, only the peak cylinder combustion pressure signal pulses occurring during this period are gated through NOR gate 71 to the system, all others being rejected. With four stroke cycle engines, any one cylinder is fired once every two crankshaft revolutions. It is necessary, therefore, that NOR gate 71 be enabled only during the monitored engine cylinder firing events. As RS flip-flop circuit 55 is switched to the "Reset" condition in which a logic 1 signal is present upon the $\overline{Q}$ output terminal in response to a monitored engine cylinder firing event and to the "Set" condition in which a logic 0 signal is present upon the $\overline{Q}$ output terminal in response to the monitored engine cylinder top dead center signal as previously explained, the transition of a logic 1 signal to a logic 0 signal upon the $\overline{Q}$ output terminal of RS flip-flop circuit 55 occurs every two engine crankshaft revolutions, curve F. As this transition from a logic 1 to a logic 0 signal occurs once every two engine crankshaft revolutions, RS flip-flop circuit 70 is switched to the "Reset" condition in which a logic 0 signal is present upon the Q output terminal to enable NOR gate 71 every other engine crankshaft revolution. RS flip-flop circuit 55, therefore, is necessary with four stroke cycle engine applications to assure that NOR gate 71 is enabled only during the monitored engine cylinder firing events. With two stroke cycle engine applications or with applications wherein the previously described permanent magnet that supplied the magnetic flux for producing the top dead center and Beta signals is rotated in timed relationship with, but at one-half the speed of the engine crankshaft, the RS flip-flop circuit 55 may be omitted.

At the time RS flip-flop circuit 60 is triggered to the "Set" condition by the logic 1 No. 1 engine cylinder peak cylinder combustion pressure signal produced by NOR gate 71 as previously described, the logic 0 signal upon the $\overline{Q}$ output terminal of RS flip-flop circuit 60 is applied to the control "C" input terminal of bilateral switch 66 and the logic 1 signal present upon the Q output terminal thereof is applied to the control "C" input terminal of conventional electronic bilateral switch 72 and is differentiated by the capacitor 77-resistor 78 combination to a logic 1 potential spike upon junction 79. Diode 81 diverts the negative polarity spike of the differentiated signal to point of reference or ground potential 5.

The logic 1 potential spike upon junction 79 is applied to the R "Reset" input terminal of conventional NOR gate RS flip-flop circuit 80. This logic 1 signal triggers RS flip-flop circuit 80 to the "Reset" condition in which a logic 0 timing adjustment period signal is present upon the Q output terminal and a logic 1 signal is present upon the $\overline{Q}$ output terminal, curves K and L of FIG. 5.

The logic 0 signal upon the $\overline{Q}$ output terminal of RS flip-flop circuit 60 disables bilateral switch 66 thereby conditioning integrator capacitor 65 for an integration cycle. The logic 1 signal upon the Q output terminal of RS flip-flop circuit 60 triggers electronic bilateral switch 72 conductive to connect point of reference or ground potential 5 through input resistor 76 to the inverting input terminal of operational amplifier circuit 75, the non-inverting input terminal of which is connected through resistor 73 to the previously described source of reference potential $V_R$. Consequently, upon the triggering of the electronic bilateral switch 72 conductive, operational amplifier 75 begins charging integrator capacitor 65 linearly with time in a positive direction from the reference potential magnitude at a substantially constant predetermined rate. This direct current potential ramp signal is applied to the non-inverting input terminal and the direct current potential engine speed signal $V_s$ is applied to the inverting input terminal of conventional voltage comparator circuit 85. Resistor 84 is the comparator circuit 85 pullup resistor.

While the direct current potential ramp signal applied to the non-inverting input terminal of comparator circuit 85 is of a potential magnitude less than that of the direct current potential engine speed signal $V_s$, comparator circuit 85 produces a logic 0 output signal. When the direct current potential ramp signal has ramped up to a potential magnitude greater than that of the engine speed signal $V_s$, the output signal of comparator circuit 85 switches from a logic 0 to a logic 1. This logic 1 signal is applied to the S "Set" input terminal of RS flip-flop circuit 80 to trigger this device to the "Set" condition in which a logic 1 signal is present upon the Q output terminal and a logic 0 signal is present upon the $\overline{Q}$ output terminal, curves K and L of FIG. 5. For proper circuit operation, the logic 0 timing adjustment period signal, produced upon the Q output terminal of RS flip-flop circuit 80 when the logic 1 No. 1 engine cylinder peak cylinder combustion pressure signal triggers flip-flop circuit 60 to the "Set" condition, should subsist for a period of time corresponding to the time required for the associated engine crankshaft to rotate through a predetermined constant engine crankshaft angle at the speed at which the engine is running. The logic 1 output signal of comparator circuit 85, therefore, should be produced at the termination of the period of time after integrator capacitor 65 is conditioned for the integration cycle which is equal to the period of time required for the engine crankshaft to rotate through the predetermined constant crankshaft angle at the speed at which the engine is running. Therefore, the integrator circuit including operational amplifier 75 and integrator capacitor 65, is designed to produce a direct current potential ramp signal which increases linearly with time in direct current potential magnitude at a rate at which this signal will ramp up to a potential magnitude equal to that of the engine speed signal $V_s$ in the period of time equal to that required for the engine crankshaft to rotate through the predetermined constant crankshaft angle at the speed at which the engine is running.

The rate, volts per second, at which the direct current potential ramp signal produced by operational amplifier 75 and integrator capacitor 65 increases lineary with time is equal to the product of the reciprocal of the ratio of the predetermined constant engine crankshaft angle to 180 engine crankshaft degrees multiplied by the rate, volts per second, that the engine speed direct current potential ramp signal decreases linearly with time. In an actual embodiment, the predetermined constant crankshaft angle is six engine crankshaft degrees. Therefore, in the actual embodiment, the rate at which this direct current potential ramp signal increases linearly with time is 1500 volts per second, the product of the reciprocal of the ratio of six engine crankshaft degrees to 180 engine crankshaft degrees, $(6°/180°)^{-1} = (1/30)^{-1} = 30$, multiplied by the rate at which the engine speed direct current potential ramp signal decreases linearly with time, $-50$ volts per second.

Figure 2:
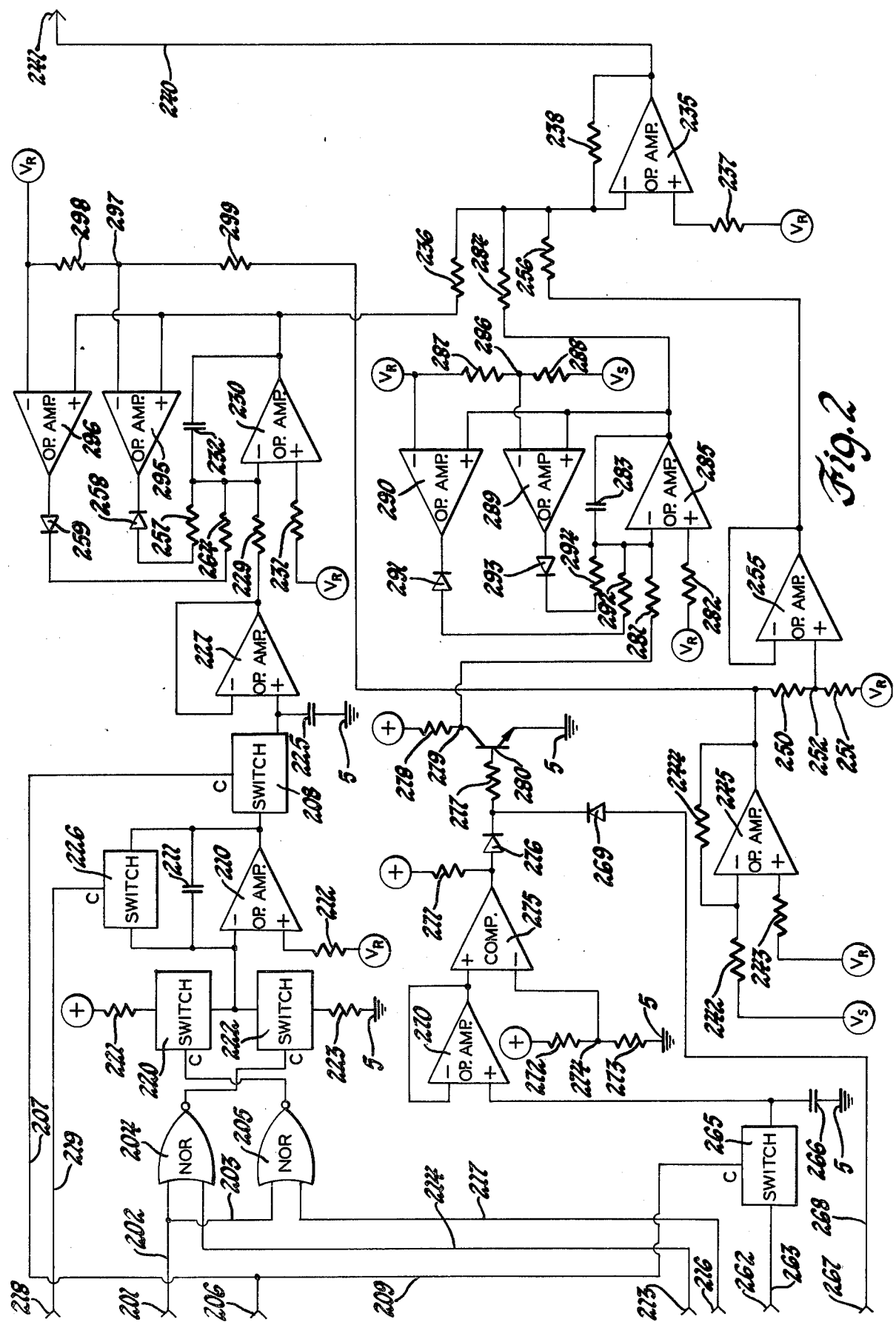

The output signal upon the Q output terminal of RS flip-flop circuit 80 of FIG. 1 is applied through circuit point 82 of FIG. 1 and circuit point 201 and respective leads 202 and 203 of FIG. 2 to one of the input terminals of each of conventional two input NOR gates 204 and 205 and the output signal upon the $\overline{Q}$ output terminal thereof is applied through circuit point 83 of FIG. 1 and circuit point 206 and lead 207 of FIG. 2 to the control "C" input terminal of conventional bilateral switch 208. Concurrently with the output signals of RS flip-flop circuit 80, the output signal upon the Q output terminal of RS flip-flop circuit 50 of FIG. 1 is applied through circuit point 86 of FIG. 1 and circuit point 213 and lead 214 of FIG. 2 to the other input terminal of NOR gate 204 and the output signal upon the $\overline{Q}$ output terminal thereof is applied through circuit point 87 of FIG. 1 and circuit point 216 and lead 217 of FIG. 2 to the other input terminal of conventional NOR gate 205.

In FIG. 2, conventional operational amplifier circuit 210 and integrator capacitor 211 and resistors 221 and 223 comprise a timing adjustment signal integrator circuit. As the non-inverting input terminal of operational amplifier circuit 210 is connected to the previously described source of direct current reference potential $V_R$ through resistor 212, the timing adjustment signal integrator circuit produces a direct current potential timing adjustment signal which ramps in a positive going direction from the reference potential magnitude when ignition spark timing advance is required and which ramps in a negative going direction from the reference potential magnitude when ignition spark timing retard is required, as will be later explained.

For the purpose of this specification, it will be assumed that flip-flop circuit 80 is to remain in the "Reset" condition in which a logic 0 timing adjustment period signal is present upon the Q output terminal thereof for a period of time corresponding to a constant engine crankshaft angle of six mechanical degrees at all engine speeds and that the predetermined desired engine crankshaft angle relative to piston top dead center at which peak cylinder combustion pressure is desired to occur is fifteen engine crankshaft degrees after piston top dead center.

Figure 8:
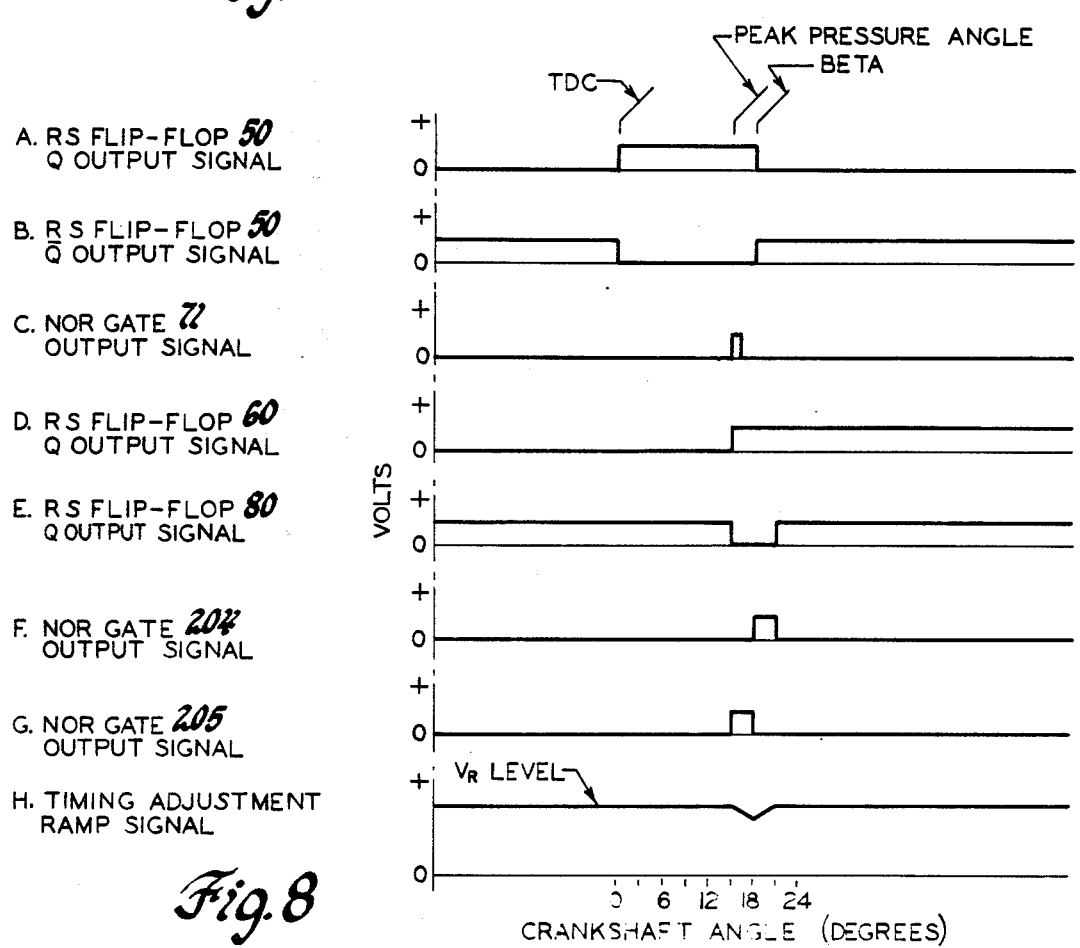
Figure 9:
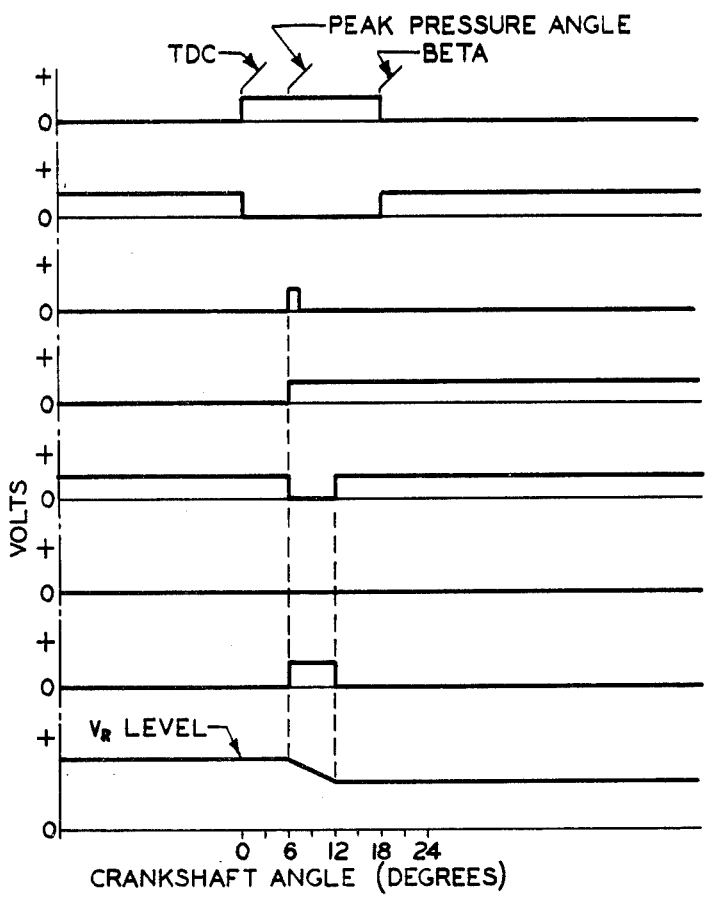
Figure 10:
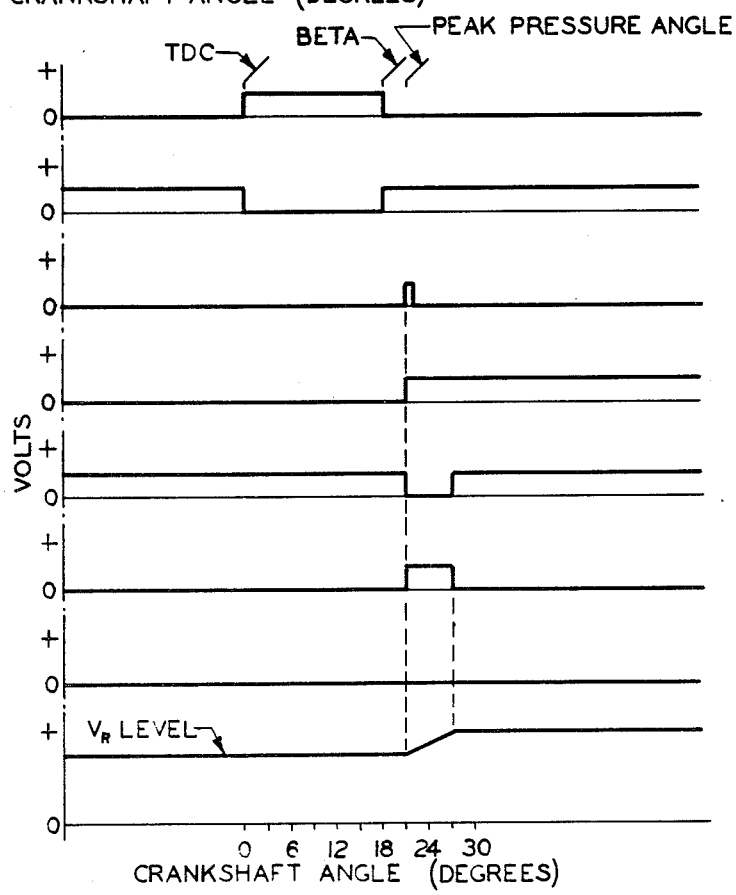

In each of FIGS. 8, 9 and 10, the output signals of RS flip-flop circuit 50, the output signal of NOR gate 71, the output signal upon the Q output terminal of RS flip-flop circuit 60, the output signal upon the Q output terminal of RS flip-flop circuit 80 of FIG. 1, the output signal of each of conventional two input NOR gates 204 and 205 and the output timing adjustment signal of the timing adjustment signal integrator circuit of FIG. 2 are shown on an expanded scale. As has been previously explained, the top dead center signal induced in pickup coil 8 of FIG. 1 triggers RS flip-flop circuit 50 to the "Set" condition in which a logic 1 signal is present upon the Q output terminal and a logic 0 signal is present upon the $\overline{Q}$ output terminal thereof, curves A and B of FIGS. 8, 9 and 10, and the Beta signal induced in pickup coil 9 triggers RS flip-flop circuit 50 to the "Reset" condition in which a logic 0 signal is present upon the Q output terminal thereof and a logic 1 signal is present upon the $\overline{Q}$ output terminal thereof. Upon the occurrence of peak cylinder combustion pressure in the monitored engine cylinder, conventional NOR gate 71 produces a logic 1 output signal pulse, curve C of FIGS. 8, 9 and 10. This logic 1 signal triggers RS flip-flop circuit 60 to the "Set" condition in which a logic 1 signal appears upon the Q output terminal thereof, curve D of FIGS. 8, 9 and 10, which, after being differentiated by capacitor 77 and resistor 78, triggers RS flip-flop circuit 80 to the "Reset" condition in which a logic 0 timing adjustment period signal is present upon the Q output terminal thereof, curve E of FIGS. 8, 9 and 10, and a logic 1 signal is present upon the $\overline{Q}$ output terminal. The logic 1 signal upon the $\overline{Q}$ output terminal is applied to the "b" input terminal of a conventional two input NOR gate 88. With a logic 1 signal present upon one of the input terminals thereof, NOR gate 88 produces a logic 0 output signal. This logic 0 signal is applied through circuit point 92 of FIG. 1 and circuit point 218 and lead 219 to the control "C" input terminal of conventional bilateral switch 226 to render this device not conductive.

In FIG. 8, the peak cylinder combustion pressure of the monitored engine cylinder is indicated as occurring at the predetermined engine crankshaft angle, 15° after top dead center. Upon the occurrence of peak cylinder combustion pressure in the monitored engine cylinder, the logic 0 signal present upon the $\overline{Q}$ output terminal of RS flip-flop circuit 50, curve B, and the logic 0 timing adjustment period signal present upon the Q output terminal of RS flip-flop circuit 80, curve E, are applied concurrently through circuitry previously explained to respective input terminals of conventional NOR gate 205 and the logic 1 signal upon the $\overline{Q}$ output terminal of RS flip-flop circuit 80 is applied through circuitry previously explained to the control "C" input terminal of bilateral switch 208 to trigger this device conductive. With a logic 0 signal present upon both of the input terminals thereof, conventional NOR gate 205 produces a logic 1 output signal, curve G, which is applied to the control "C" input terminal of conventional bilateral switch 220. This logic 1 signal triggers bilateral switch 220 conductive to connect the positive polarity output terminal of the operating potential source to the inverting input terminal of operational amplifier circuit 210 through resistor 221. As the non-inverting input terminal of operational amplifier circuit 210 is connected to the source of reference potential $V_R$ of a positive direct current potential magnitude less than that of the operating potential magnitude, the timing adjustment signal integrator circuit produces an output direct current potential timing adjustment signal which ramps in a negative going direction from the reference potential level at a substantially constant rate with time, curve H, indicating ignition spark retard is required. This timing adjustment signal is impressed upon sample and hold capacitor 225 through conducting bilateral switch 208. Upon the occurrence of the Beta signal, RS flip-flop circuit 50 of FIG. 1 is triggered to the "Reset" condition in which a logic 0 signal is present upon the Q output terminal, curve A, and a logic 1 signal is present upon the $\overline{Q}$ output terminal, curve B. The logic 0 signal present upon the Q output terminal of RS flip-flop circuit 50 and the logic 0 timing adjustment period signal still present upon the Q output terminal of RS flip-flop circuit 80 are applied concurrently through circuitry previously described to respective input terminals of conventional NOR gate 204. With a logic 0 signal present upon both of the input terminals thereof, NOR gate 204 produces a logic 1 output signal, curve F, which is applied to the control "C" input terminal of conventional bilateral switch 222. Simultaneously, the logic 1 signal upon the $\overline{Q}$ output terminal of RS flip-flop circuit 50 is applied through circuitry previously explained to one of the input terminals of NOR gate 205. With a logic 1 signal present upon one of the input terminals thereof, NOR gate 205 produces a logic 0 output signal which renders bilateral switch 220 not conductive. The logic 1 output signal of NOR gate 204 triggers bilateral switch 222 conductive to connect the inverting input terminal of operational amplifier circuit 210 to point of reference or ground potential 5 through resistor 223. As the non-inverting input terminal of operational amplifier circuit 210 is connected to the source of reference potential $V_R$ of a positive direct current potential magnitude, the timing adjustment signal integrator circuit produces an output direct current potential timing adjustment signal which ramps in the opposite positive going direction toward the reference potential level at a substantially constant rate with time, curve H, indicating ignition spark advance is required. This timing adjustment signal is impressed upon sample and hold capacitor 225 through conducting bilateral switch 208. When the magnitude of the ramp signal output of operational amplifier circuit 75 of FIG. 1 reaches a potential magnitude equal to that of the engine speed signal $V_s$ in six engine crankshaft degrees in rotation, comparator circuit 85 produces a logic 1 output signal which triggers RS flip-flop circuit 80 to the "Set" condition in which a logic 1 signal is present upon the Q output terminal, curve E, to terminate the timing adjustment period signal and a logic 0 signal is present upon the $\overline{Q}$ output terminal. The logic 1 output signal upon the Q output terminal of RS flip-flop circuit 80 is applied through circuitry previously explained to respective input terminals of NOR gates 204 and 205 and to the input terminal of a conventional monostable multivibrator circuit 95 to trigger this device to the alternate state in which a logic 1 signal is present upon the output terminal thereof. This monostable multivibrator circuit may be the same as that previously described with regard to FIG. 12. The logic 1 output signal of monostable multi-vibrator circuit 95 is applied to the "a" input terminal of NOR gate 88. Consequently, NOR gate 88 maintains a logic 0 signal upon the output terminal thereof. With a logic 1 signal present upon one of the input terminals of each of NOR gates 204 and 205, these devices produce respective logic 0 output signals which render respective bilateral switches 222 and 220 not conductive, a condition which terminates the timing adjustment signal integration cycle of the timing adjustment signal integrator circuit, curve H. The logic 0 output signal upon the $\overline{Q}$ output terminal of RS flip-flop circuit 80 is applied through circuitry previously described to the control "C" input terminal of bilateral switch 208 to render this device not conductive. When bilateral switch 208 goes not conductive, the timing adjustment signal is stored as a charge upon sample and hold capacitor 225 where it is trapped and held. At this time, the timing adjustment signal stored as a charge upon sample and hold capacitor 225 is of a potential magnitude equal to that of the reference potential $V_R$, an indication that no ignition spark timing adjustment is required. When monostable multivibrator circuit 95 times out and spontaneously returns to the stable state, a logic 0 signal appears upon the output terminal thereof which is applied to the "a" input terminal of NOR gate 88. As the logic 0 signal present upon the $\overline{Q}$ output terminal of RS flip-flop circuit 80 is applied to the "b" input terminal of NOR gate 88, this device produces a logic 1 output signal. This logic 1 output signal is applied through circuitry previously described to the control "C" input terminal of conventional bilateral switch 226. This logic 1 signal triggers bilateral switch 226 conductive to discharge integrator capacitor 211, thus preparing the timing adjustment signal integrator circuit for the next timing adjustment signal integration cycle.

In FIG. 9, the peak cylinder combustion pressure of the monitored engine cylinder is indicated as occurring at nine engine crankshaft degrees before the predetermined desired engine crankshaft angle, 15° after top dead center. Upon the occurrence of peak cylinder combustion pressure in the monitored engine cylinder, the logic 0 signal present upon the $\overline{Q}$ output terminal of RS flip-flop circuit 50, curve B, and the logic 0 timing adjustment period signal present upon the Q output terminal of RS flip-flop circuit 80, curve E, are applied concurrently through circuitry previously explained to respective input terminals of conventional NOR gate 205 and the logic 1 signal upon the $\overline{Q}$ output terminal of RS flip-flop circuit 80 is applied through circuitry previously explained to the control "C" input terminal of bilateral switch 208 to trigger this device conductive. With a logic 0 signal present upon both of the input terminals thereof, conventional NOR gate 205 produces a logic 1 output signal, curve G, which is applied to the control "C" input terminal of conventional bilateral switch 220. This logic 1 signal triggers bilateral switch 220 conductive to connect the positive polarity output terminal of the operating potential source to the inverting input terminal of operational amplifier circuit 210 through resistor 221. As the non-inverting input terminal of operational amplifier circuit 210 is connected to the source of reference potential $V_R$ of a positive direct current potential magnitude less than that of the operating potential magnitude, the timing adjustment signal integrator circuit produces an output direct current potential timing adjustment ramp signal which ramps in a negative going direction from the reference potential level at a substantially constant rate with time, curve H, indicating ignition spark retard is required. This timing adjustment signal is impressed upon sample and hold capacitor 225 through conducting bilateral switch 208. When the magnitude of the ramp signal output of operational amplifier circuit 75 of FIG. 1 reaches a potential magnitude equal to that of the engine speed signal $V_s$ in six engine crankshaft degrees of rotation, comparator circuit 85 produces a logic 1 output signal which triggers RS flip-flop circuit 80 to the "Set" condition in which a logic 1 signal is present upon the Q output terminal, curve E, to terminate the timing adjustment period signal and a logic 0 signal is present upon the $\overline{Q}$ output terminal. The logic 1 output signal upon the Q output terminal of RS flip-flop circuit 80 is applied through circuitry previously explained to respective input terminals of NOR gates 204 and 205 and to the input terminal of conventional monostable multivibrator circuit 95 to trigger this device to the alternate state in which a logic 1 signal is present upon the output terminal thereof. The logic 1 output signal of monostable multivibrator circuit 95 is applied to the "a" input terminal of NOR gate 88. Consequently, NOR gate 88 maintains a logic 0 signal upon the output terminal thereof. With a logic 1 signal present upon one of the input terminals of each of NOR gates 204 and 205, these devices produce respective logic 0 output signals which render respective bilateral switches 222 and 220 not conductive, a condition which terminates the timing adjustment signal integration cycle of the timing adjustment signal integrator circuit, curve H. The logic 0 output signal upon the $\overline{Q}$ output terminal of RS flip-flop circuit 80 is applied through circuitry previously explained to the control "C" input terminal of bilateral switch 208 to render this device not conductive. When the bilateral switch 208 goes not conductive, the timing adjustment signal is stored as a charge upon sample and hold capacitor 225 where it is trapped and held. At this time the timing adjustment signal stored as a charge upon sample and hold capacitor 225 is of a magnitude less than that of the reference potential magnitude, an indication that ignition spark retard is required. When monostable multivibrator circuit 95 times out and spontaneously returns to the stable state, a logic 0 signal appears upon the output terminal thereof which is applied to the "a" input terminal of NOR gate 88. As the logic 0 signal present upon the $\overline{Q}$ output terminal of RS flip-flop circuit 80 is applied to the "b" input terminal of NOR gate 88, this device produces a logic 1 output signal. This logic 1 output signal is applied through circuitry previously described to the control "C" input terminal of conventional bilateral switch 226. This logic 1 signal triggers bilateral switch 226 conductive to discharge integrator capacitor 211, thus preparing the timing adjustment signal integrator circuit for the next timing adjustment signal integration cycle.

In FIG. 10, the peak cylinder combustion pressure of the monitored engine cylinder is indicated as occurring at six engine crankshaft degrees after the predetermined desired engine crankshaft angle, 15° after top dead center. Upon the occurrence of peak cylinder combustion pressure in the monitored engine cylinder, the logic 0 signal present upon the Q output terminal of RS flip-flop circuit 50, curve A, and the logic 0 timing adjustment period signal present upon the Q output terminal of RS flip-flop circuit 80, curve E, are applied concurrently through circuitry previously explained to respective input terminals of conventional NOR gate 204 and the logic 1 signal upon the $\overline{Q}$ output terminal of RS flip-flop circuit 80 is applied through circuitry previously explained to the control "C" input terminal of bilateral switch 208 to trigger this device conductive. With a logic 0 signal present upon both of the input terminals thereof, conventional NOR gate 204 produces a logic 1 output signal, curve F, which is applied to the control "C" input terminal of conventional bilateral switch 222. This logic 1 signal triggers bilateral switch 222 conductive to connect point of reference or ground potential 5 to the inverting input terminal of operational amplifier circuit 210 through resistor 223. As the non-inverting input terminal of operational amplifier circuit 210 is connected to the source of reference potential 210 of a positive direct current potential magnitude relative to ground, the timing adjustment signal integrator circuit produces an output direct current potential timing adjustment signal which ramps in a positive going direction from the reference potential level at a substantially constant rate with time, curve H, indicating ignition spark advance is required. This timing adjustment signal is impressed upon sample and hold capacitor 225 through conducting bilateral switch 208. When the magnitude of the ramp signal output of operational amplifier circuit 75 of FIG. 1 reaches a potential magnitude equal to that of the engine speed signal $V_s$ in six engine crankshaft degrees of rotation, comparator circuit 85 produces a logic 1 output signal which triggers RS flip-flop circuit 80 to the "Set" condition in which a logic 1 signal is present upon the Q output terminal, curve E, to terminate the timing adjustment period signal and a logic 0 signal is present upon the $\overline{Q}$ output terminal. The logic 1 output signal upon the Q output terminal of RS flip-flop circuit 80 is applied through circuitry previously explained to respective input terminals of NOR gates 204 and 205 and to the input terminal of conventional monostable multivibrator circuit 95 to trigger this device to the alternate state in which a logic 1 signal is present upon the output terminal thereof. The logic 1 output signal of monostable multivibrator circuit 95 is applied to the "a" input terminal of NOR gate 88. Consequently, NOR gate 88 maintains a logic 0 signal upon the output terminal thereof. With a logic 1 signal present upon one of the input terminals of each of NOR gates 204 and 205, these devices produce respective logic 0 output signals which render respective bilateral switches 222 and 220 not conductive, a condition which terminates the timing adjustment signal integration cycle of the timing adjustment signal integrator circuit, curve H. The logic 0 output signal upon the $\overline{Q}$ output terminal of RS flip-flop circuit 80 is applied through circuitry previously explained to the control "C" input terminal of bilateral switch 208 to render this device not conductive. When bilateral switch 208 goes not conductive, the timing adjustment signal is stored as a charge upon sample and hold capacitor 225 where it is trapped and held. At this time, the timing adjustment signal stored as a charge upon sample and hold capacitor 225 is of a magnitude greater than that of the reference potential magnitude, an indication that ignition spark advance is required. When monostable multivibrator circuit 95 times out and spontaneously returns to the stable state, a logic 0 signal appears upon the output terminal thereof which is applied to the "a" input terminal of NOR gate 88. As the logic 0 signal present upon the $\overline{Q}$ output terminal of RS flip-flop circuit 80 is applied to the "b" input terminal of NOR gate 88, this device produces a logic 1 output signal. This logic 1 output signal is applied through circuitry previously described to the control "C" input terminal of conventional bilateral switch 226. This logic 1 signal triggers bilateral switch 226 conductive to discharge integrator capacitor 211, thus preparing the timing adjustment signal integrator circuit for the next timing adjustment signal integration cycle.

The previously described timing adjustment signal integrator circuit produces an output direct current potential timing adjustment signal which, depending upon the occurrence of the peak cylinder combustion pressure signal for the monitored engine cylinder, ramps in a positive going direction indicating ignition spark advance is required or in a negative going direction indicating ignition spark retard is required from the positive potential level of the reference potential at a substantially constant rate with time. The rate of change or slope, positive and negative, of this timing adjustment signal must be compatible with the remainder of the circuitry of the timing system of this invention to be later described to provide ignition spark timing adjustment in accordance with the final potential magnitude of the timing adjustment signal stored as a charge upon sample and hold capacitor 225. In an actual embodiment, the rate of change of the timing adjustment signal, positive and negative going, is 1750 volts per second.

The timing adjustment signal stored as a charge upon sample and hold capacitor 225 is applied to the non-inverting input terminal of conventional operational amplifier circuit 227. Operational amplifier circuit 227, with the output terminal thereof connected to the inverting input terminal, comprises a high impedance buffer amplifier circuit which isolates sample and hold capacitor 225 from the remainder of the circuitry. In an actual embodiment, this buffer amplifier circuit is designed for unity gain. The output signal of operational amplifier circuit 227 is applied through input resistor 229 to the inverting input terminal of conventional operational amplifier circuit 230, the non-inverting input terminal of which is connected to the source of reference potential $V_R$ through input resistor 231. The operational amplifier circuit 230 and integrator capacitor 232 combination comprises an up/down peak pressure error integrator circuit. As the output signal of buffer amplifier circuit 227 is applied to the inverting input terminal of operational amplifier circuit 230, this up/down peak pressure error integrator circuit produces an output direct current potential ramp signal, hereinafter referred to as the peak pressure error signal, of a substantially constant slope in a direction opposite that of the timing adjustment signal integrator circuit output ramp signal. The up/down ignition peak pressure error integrator circuit is designed to produce a peak pressure error signal which ramps up and down from the reference potential $V_R$ level at a substantially constant rate with time. This substantially constant rate is selected to be compatible with the error signal, volts per degree of spark timing error, required by the remainder of the circuitry for providing proper ignition spark timing adjustment. In an actual embodiment, the rate of change of the up/down peak pressure error integrator circuit output ramp signal, positive and negative going, is 0.426 volts per second per volt input.

The up/down peak pressure error integrator circuit output peak pressure error signal is applied through resistor 236 to the inverting input terminal of conventional operational amplifier circuit 235, the non-inverting input terminal of which is connected to the source of reference potential $V_R$ through input resistor 237 and the output terminal of which is connected through feedback resistor 238 to the inverting input terminal thereof. Operational amplifier 235 serves as a summing junction circuit in which various signals which may enter into the ignition spark timing angle are summed. The remainder of the circuitry of FIG. 2 will be explained in detail later in this specification.

Figure 11:
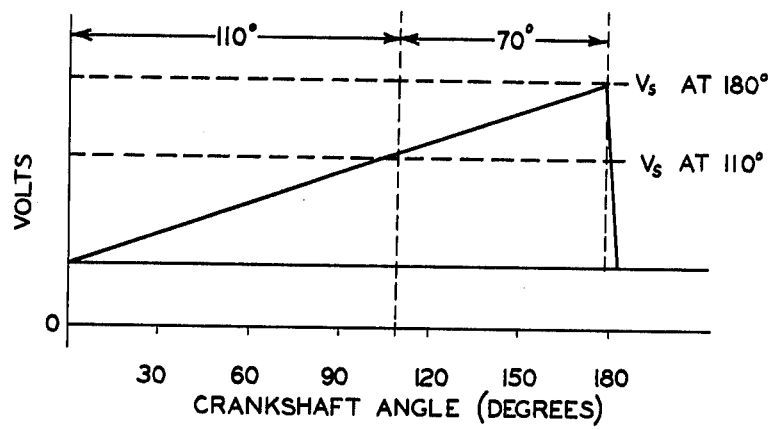

The output signal of operational amplifier circuit 235 is applied through lead 240 and circuit point 241 of FIG. 2 and circuit point 356, lead 381 and input resistor 382 of FIG. 3 to the inverting input terminal of conventional operational amplifier circuit 360, the non-inverting input terminal of which is connected through resistor 361 to the source of reference potential $V_R$ and the output terminal of which is connected to the inverting input terminal thereof through feedback resistor 362. The potential charge upon holding capacitor 335 represents the engine speed at the conclusion of the last 180° engine speed signal integration cycle previously explained. Theretofore, the signal upon the output terminal of operational amplifier circuit 345 is a potential level which represents this engine speed. As the output signal of operational amplifier circuit 345 is applied to the inverting input terminal of operational amplifier circuit 360, operational amplifier circuit 360 comprises an inverter circuit. In an actual embodiment, operational amplifier circuit 360 is designed to have a unity gain. The output signal of operational amplifier circuit 360 is applied across a resistor divider network comprising series resistors 365 and 366, the opposite terminal end of which is returned to the source of reference potential $V_R$. Series resistors 365 and 366 are of the precision resistance type, preferably one percent, which are so proportioned relative to each other that the potential upon junction 367 therebetween is of a potential magnitude equal to that of the engine speed signal at 110 crankshaft degrees, as illustrated in FIG. 11. Junction 367 between series resistors 365 and 366 is connected to the inverting input terminal of conventional voltage comparator circuit 370. Simultaneously, the engine speed ramp signal currently being generated by the engine speed signal integrator circuit including operational amplifier 338 and integrator capacitor 334 is applied through resistor 376 to the inverting input terminal of conventional operational amplifier circuit 375, the non-inverting input terminal of which is connected through resistor 377 to the source of reference potential $V_R$. Operational amplifier 375 and feedback resistor 378 comprise an inverting amplifier which is an actual embodiment is designed to have unity gain. The output signal of operational amplifier circuit 375 is connected to the non-inverting input terminal of conventional voltage comparator circuit 370. Resistor 371 is the conventional pullup resistor and resistor 372 is a feedback resistor which provides comparator circuit hysteresis in a manner well-known in the art. When the output signal of operational amplifier circuit 375 rises to a potential magnitude equal to that of the engine speed signal at 110 engine crankshaft degrees appearing upon junction 367, the output signal of comparator circuit 370 switches from a logic 0 to a logic 1 "start of ignition dwell" signal. This logic 1 "start of ignition dwell" signal is differentiated by the capacitor 373-resistor 374 combination to a positive polarity logic 1 potential spike upon junction 379. Diode 380 diverts the negative spike of this signal to point of reference or ground potential 5. The logic 1 "start of ignition dwell" output signal spike upon junction 379 is applied to one of the input terminals of a conventional two input NOR gate 385. With a logic 1 signal present upon one of the input terminals thereof, NOR gate 385 produces a logic 0 output signal which is applied to both input terminals of another conventional NOR gate 386. With a logic 0 signal present upon both input terminals thereof, NOR gate 386 produces a logic 1 output signal. The combination of NOR gates 385 and 386 provides a conventional OR function. The logic 1 output signal of NOR gate 386 is applied through circuit point 388 of FIG. 3 and circuit point 430 and lead 431 and input resistor 432 of FIG. 4 to the R "Reset" input terminal of NOR gate RS flip-flop circuit 435.

Figure 13:
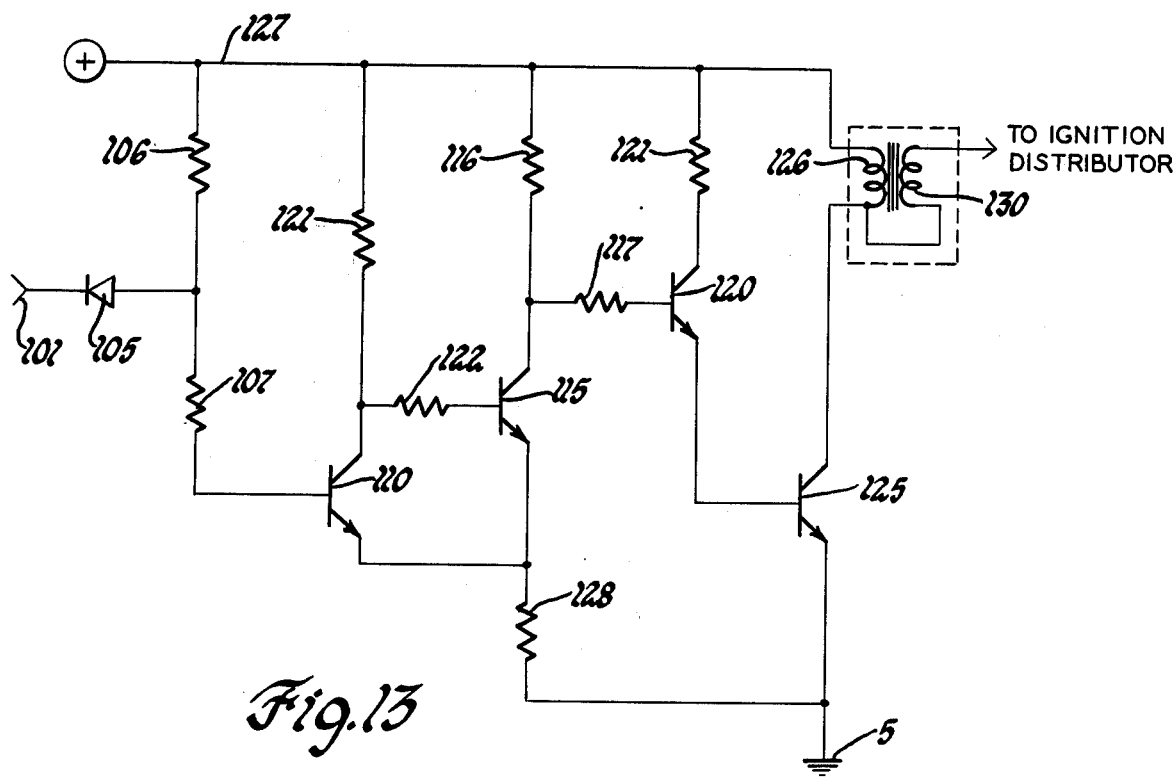
FIG. 13 is a schematic circuit for an electronic ignition system suitable for use with the ignition spark timing system of this invention.

For purposes of describing the remainder of this invention, it will be assumed for the present that there is no peak pressure error signal, that is, the output signal of operational amplifier circuit 235 is equal to $V_R$. The logic 1 output signal of NOR gate 386 triggers RS flip-flop circuit 435 to the "Reset" condition in which a logic 0 signal is present upon the Q output terminal and a logic 1 signal is present upon the $\overline{Q}$ output terminal. The logic 0 signal upon the Q output terminal is applied through resistor 436 to the base electrode of NPN transistor 440 to render this device not conductive. The resulting logic 1 signal upon junction 441 is directed to a conventional electronic ignition system which is responsive thereto to effect the completion of an associated ignition system ignition coil primary winding energizing circuit in a manner to be later explained with regard to FIG. 13. The logic 1 signal present upon the $\overline{Q}$ output terminal is applied to the control "C" input terminal of conventional bistable electronic switch 445. This logic 1 signal triggers bilateral switch 445 conductive to connect, through resistor 446, point of reference or ground potential 5 to the inverting input terminal of a conventional operational amplifier circuit 450, the non-inverting input terminal of which is connected to the reference potential source $V_R$ through resistor 451. Operational amplifier circuit 450, integrator capacitor 452 and integrator resistor 446 comprise an ignition dwell time integrator circuit which, since the non-inverting input terminal is connected to the reference potential $V_R$ and the inverting input terminal is connected to point of reference or ground potential 5, produces an output direct current potential ramp signal which ramps in a positive going direction from the reference potential level at a substantially constant rate with time when bilateral switch 445 is triggered conductive. This positive going potential ramp signal is applied to the non-inverting input terminal of a conventional voltage comparator circuit 455. Resistor 456 is the usual pullup resistor for comparator circuit 455. The previously generated engine speed signal $V_s$ currently present upon junction 411 is applied to the inverting input terminal of comparator circuit 455. When the potential magnitude of the ignition dwell time integrator circuit output potential ramp signal becomes equal to that of the engine speed signal $V_s$ applied to the inverting input terminal of comparator circuit 455, the output of comparator circuit 455 switches from a logic 0 to a logic 1. This logic 1 signal is applied to the "Set" input terminal of RS flip-flop circuit 435 to place this device in the "Set" condition in which a logic 1 signal is present upon the Q output terminal and a logic 0 signal is present upon the $\overline{Q}$ output terminal thereof. The logic 0 signal upon the $\overline{Q}$ output terminal of flip-flop circuit 435 disables bilateral switch 455 to disconnect ground from the inverting input terminal of operational amplifier circuit 450 and the logic 1 signal upon the Q output terminal thereof is applied to the control "C" input terminal of a conventional electronic bilateral switch 460 and through resistor 436 to the base electrode of NPN transistor 440. This logic 1 signal triggers bilateral switch 460 conductive to discharge integrator capacitor 452 thereby resetting the ignition dwell time integrator circuit in preparation for the next ignition dwell time integration cycle upon the occurrence of the next logic 1 "start of ignition dwell" pulse and is of the proper polarity relationship to provide base-emitter drive current through an NPN transistor. As the collector electrode of NPN transistor 440 is connected to the positive polarity terminal of the operating potential source through collector resistor 442 and the emitter electrode is connected to point of reference or ground potential 5, this base-emitter drive current triggers NPN transistor 440 conductive through the collector-emitter electrodes to place a substantially ground potential logic 0 "end of ignition dwell" signal upon junction 441. This logic 0 "end of ignition dwell" signal is directed to a conventional electronic ignition system which is responsive thereto to effect the interruption of the associated ignition coil energizing circuit to produce an ignition spark creating potential in a manner to be later explained.

The ignition dwell time is determined by the period of time required for the ignition dwell time integrator circuit output potential ramp signal to reach a potential magnitude equal to that of the engine speed signal $V_s$ present upon junction 411. In response to this equality, voltage comparator circuit 455 produces a logic 1 output signal. The logic 1 output signal of comparator circuit 455, therefore, should be produced at the termination of the period of time after the ignition dwell time integrator circuit is conditioned for the dwell time integration cycle upon the triggering of bilateral switch 455 conductive which is equal to the period of time required for the engine crankshaft to rotate through a predetermined ignition dwell time crankshaft angle at the speed at which the engine is running. Therefore, the dwell time integrator circuit is designed to produce an output positive going direct current potential ramp signal which changes in potential magnitude linearly with time at the substantially constant rate at which the potential magnitude of this signal will equal that of the engine speed signal $V_s$ upon junction 411 in the period of time required for the engine crankshaft to rotate through a predetermined ignition dwell time crankshaft angle at the speed at which the engine is running.

The rate, volts per second, at which ignition dwell time integrator circuit output direct current potential ramp signal changes linearly with time is equal to the product of the reciprocal of the ratio of a predetermined ignition dwell time engine crankshaft angle ot 180 engine crankshaft degrees multiplied by the rate, volts per second, that the engine speed direct current potential ramp signal decreases linearly with time. For example, should the predetermined ignition dwell time crankshaft angle be sixty engine crankshaft degrees, the rate at which the ignition dwell time integrator circuit output direct current potential ramp signal increases linearly with time is 150 volts per second, the product of the reciprocal of the ratio of sixty engine crankshaft degrees to 180 engine crankshaft degrees, $(60°/180°)^{-1} = (1/3)^{-1} = 3$, multiplied by the rate at which the engine speed direct current potential ramp signal decreases linearly with time, −50 volts per second.

Assuming the ignition dwell time to be sixty engine crankshaft degrees, with no timing adjustment signal, the firing event of the next engine cylinder to be fired would occur thirty engine crankshaft degrees before piston top dead center (180°−110°−60°) ignition dwell = 10° before top dead center plus the 20° before top dead center at which the pickup line 302 wave form, FIG. 6A, crosses zero from a positive to a negative polarity or 30 engine crankshaft degrees ignition spark advance.

As the ignition dwell time as determined by the ignition dwell time integrator circuit hereinabove described is of a period of time equal to a constant number of engine crankshaft degrees at all engine speeds, to produce ignition spark advance, the logic 1 "start of ignition dwell" pulses must be produced earlier during the 180 engine crankshaft degrees engine speed signal integration cycles and to produce ignition spark retard, the logic 1 "start of ignition dwell" signal pulses must be produced later during each 180 engine crankshaft degrees engine speed signal integration cycles. This is true because the inverted direct current potential engine speed ramp signal currently being generated and present upon the output terminal of unity gain inverter circuit 375 is compared by voltage comparator circuit 375 with the previous engine speed signal at 110 engine crankshaft degrees present upon junction 367, as previously explained. To produce the "start of the ignition dwell" signal earlier during the 180 engine crankshaft degrees engine speed signal integration cycles, it is necessary that the value of the signal upon junction 367 of FIG. 3 be reduced and to produce the logic "start of ignition dwell" signal later during each 180 engine crankshaft degrees engine speed integration cycle, it is necessary that the potential upon junction 367 be increased.

As has been previously brought out, the timing adjustment signal integrator circuit of FIG. 2 produces an output direct current potential timing adjustment signal which ramps in a positive going direction from the positive potential level of the reference potential $V_R$ when ignition spark advance is required and which ramps in a negative going direction from the positive potential level of the reference potential $V_R$ when ignition spark retard is required. In response to the direct current potential timing adjustment signal stored as a charge upon sample and hold capacitor, the up/down peak pressure error integrator circuit of FIG. 2, previously described, produces an output direct current potential ramp signal of a substantially constant slope in a direction opposite to that of the timing adjustment signal integrator circuit output ramp signal. The up/down peak pressure error integrator circuit output signal is inverted by the summing junction operational amplifier circuit 235 of FIG. 2. Consequently, summing junction operational amplifier circuit 235 produces a positive going ignition spark timing output signal when ignition spark advance is required and a negative going ignition spark timing output signal when ignition spark retard is required. The ignition spark timing output signal of summing junction operational amplifier circuit 235 is applied through lead 240 and circuit point 241 of FIG. 2 and circuit point 356 and lead 381 and input resistor 382 of FIG. 3 to the inverting input terminal of operational amplifier circuit 360 connected as a unity gain inverter and through lead 383 to the corresponding circuit point of the circuitry represented by block 301.

The combination of a positive going ignition spark timing advance signal and the negative polarity engine speed signal representation output of buffer amplifier circuit 345 applied to the inverting input terminal of operational amplifier circuit 360 results in a reduction of the potential magnitude upon junction 367. With a reduced potential magnitude upon junction 367, the positive going engine speed ramp signal output of operational amplifier circuit 375 ramps up to a potential magnitude equal thereto earlier during this engine speed signal integration cycle, a condition which results in the production of a logic 1 "start of ignition dwell" output signal pulse earlier during the engine speed signal integration cycle, as is required for ignition spark advance.

The combination of a negative going ignition spark timing retard signal and the negative polarity engine speed signal representation output of buffer amplifier circuit 345 applied to the inverting input terminal of operational amplifier circuit 360 results in an increase of the potential magnitude upon junction 367. With an increased potential magnitude upon junction 367, the positive going engine speed ramp signal output of operational amplifier circuit 375 ramps up to a potential magnitude equal thereto later during the engine speed signal integration cycle, a condition which results in the production of a logic 1 "start of ignition dwell" output signal pulse later during the engine speed signal integration cycle, as is required for ignition spark retard.

Figure 15:
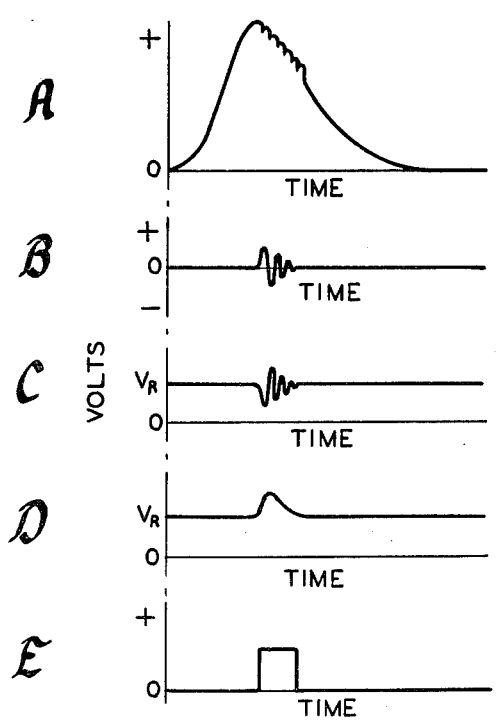
FIG. 15 is a set of curves useful in understanding the circuit of FIG. 14.

In FIG. 15, one example of a transistor ignition system suitable for use with the ignition spark timing system of this invention is set forth in schematic form. As has been previously brought out, upon the occurrence of a logic 1 "start of ignition dwell" output signal pulse from NOR gate 386 of FIG. 3, RS flip-flop circuit 435 of FIG. 4 is triggered thereby to the "Reset" condition in which a logic 0 signal is present upon the Q output terminal thereof. This logic 0 signal, applied through resistor 436 to the base electrode of NPN transistor 440, biases NPN transistor 440 not conductive. While transistor 440 is not conductive, a logic 1 signal of a potential substantially equal to the operating potential is present upon junction 441. This logic 1 signal is applied through circuit point 443 of FIG. 4 and circuit point 101 of FIG. 13 to the cathode electrode of diode 105 to reverse bias diode 105 which now has substantially the same potential applied to both the anode and cathode electrodes thereof. When diode 105 becomes reverse biased, base-emitter drive current is supplied to NPN transistor 110 through resistors 106 and 107. While base-emitter drive current is supplied to transistor 110, this device conducts through the collector-emitter electrodes thereof to divert base-emitter drive current from NPN transistor 115, consequently, transistor 115 is not conductive. While transistor 115 is not conductive, base-emitter drive current is supplied to NPN transistor 120 through resistors 116 and 117, consequently, transistor 120 conducts through the collector-emitter electrodes. While transistor 120 conducts through the collector-emitter electrodes, base-emitter drive current is supplied to NPN switching transistor 125 through resistor 121 and the collector-emitter electrodes of transistor 120. While base-emitter drive current is supplied to switching transistor 125, this device conducts through the collector-emitter electrodes to complete the ignition coil primary winding 126 energizing circuit which may be traced from the positive polarity output terminal of the operating potential source, through lead 127, primary winding 126, the collector-emitter electrodes of switching transistor 125 and point of reference or ground potential 5. Resistor 128 provides a reverse bias upon the emitter electrode of transistor 115 when transistor 110 is triggered conductive to provide a more sharp cut-off thereof upon the conduction of transistor 110. Also as has been previously brought out, upon the occurrence of a logic 1 "end of ignition dwell" output signal pulse from voltage comparator circuit 455 of FIG. 4, RS flip-flop circuit 435 is triggered to the "Set" condition in which a logic 1 signal is present upon the Q output terminal thereof. This logic 1 signal, applied through resistor 436 to the base electrode of NPN transistor 440, supplies base-emitter drive current to NPN transistor 440 to trigger this device conductive through the collector-emitter electrodes thereof. While transistor 440 is conductive, a logic 0 signal of substantially ground potential is present upon junction 441. This logic 0 signal forward biases diode 105 of FIG. 13. At the moment diode 105 becomes forward biased by the substantially ground potential on junction 441, conducting transistor 440 diverts base-emitter drive current from NPN transistor 110 to extinguish this device. With NPN transistor 110 not conducting, base-emitter drive current is supplied to NPN transistor 115 through resistors 121 and 122 in the proper polarity relationship to produce base-emitter drive current through an NPN transistor, consequently, transistor 115 conducts through the collector-emitter electrodes. Conducting transistor 115 diverts base-emitter drive current from NPN transistor 120, consequently, transistor 120 is rendered not conductive. When transistor 120 is rendered not conductive, base-emitter drive current is no longer supplied to NPN switching transistor 125, consequently, switching transistor 125 extinguishes to abruptly interrupt the ignition coil primary winding 126 energizing circuit. Upon each interruption of the primary winding 126 energizing circuit, an ignition spark potential of a sufficiently high value to initiate an ignition spark across the gap of the engine spark plug to which it is directed is induced in secondary winding 130 by the resulting collapsing magnetic field in a manner well-known in the automotive art. This high ignition potential is directed to the next spark plug to be fired through a conventional ignition distributor, not shown, in a manner well-known in the automotive art.

For proper operation of the system of this invention, it is necessary that NOR gate RS flip-flop circuit 435 of FIG. 4 be placed in the Reset condition upon the application of operating potential. Therefore, a capacitor 465 is connected across the positive polarity output terminal of the operating potential source and the R "Reset" input terminal of RS flip-flop circuit 435. Upon the initial application of operating potential, a logic 1 signal is passed through capacitor 465 to place RS flip-flop circuit 435 in the Reset condition.

Referring to FIG. 2, the engine speed signal $V_s$ is applied through input resistor 242 to the inverting input terminal of conventional operational amplifier circuit 245, the non-inverting input terminal of which is connected through resistor 243 to the source of reference potential $V_R$ and the output terminal of which is connected to the inverting input terminal thereof through feedback resistor 244. In an actual embodiment, operational amplifier circuit 245 was designed to be a unity gain inverter circuit. The output signal of operational amplifier circuit 245 and the source of reference potential $V_R$ are connected across series resistors 250 and 251, the junction 252 therebetween being connected to the non-inverting input terminal of conventional operational amplifier circuit 255 connected as a buffer amplifier circuit. Series resistors 250 and 251 are so proportioned relative to each other that the potential magnitude upon junction 252 is equal to that of the engine speed signal corresponding to a predetermined engine crankshaft angle. The output signal of buffer operational amplifier circuit 255 is applied through input resistor 256 to the inverting input terminal of summing junction operational amplifier circuit 235. As the potential upon junction 252 is always of a negative polarity, being the inversion of the engine speed signal $V_s$, the output signal of buffer operational amplifier circuit 255 is of a negative polarity. This negative polarity signal is inverted by summing junction operational amplifier circuit 235 to a positive polarity ignition spark advance signal upon lead 240 which results in an ignition spark advance as previously explained. The purpose of the circuitry just described is to provide a constant initial ignition spark advance at all times. Assuming for purposes of this specification that an initial constant ignition spark advance of 20 engine crankshaft degrees is required, resistors 250 and 251 are proportioned relative to each other in such a manner that the potential upon junction 252 is of a negative polarity and of a potential magnitude equal to that of the negative going direct current engine speed ramp signal produced by the engine speed signal integrator circuit of FIG. 3 at 20 engine crankshaft degrees.

A peak cylinder combustion pressure amplitude limit and an engine detonation or knock limit is provided for the purpose of retarding the ignition spark in the event the peak cylinder combustion pressure amplitude exceeds a predetermined maximum value or should engine detonation or knock occur.

Referring to FIG. 1, the cylinder combustion pressure signal produced by pressure signal source 2 and charge amplifier 3 is filtered by filter circuit 4, as previously explained, and is applied through lead 89 and circuit point 90 of FIG. 1 and circuit point 262 and lead 263 to one side of conventional bilateral switch 265. The logic 1 output signal upon the $\bar{Q}$ output terminal of RS flip-flop circuit 80 of FIG. 1 during the timing adjustment signal integration cycle, curve L of FIG. 5, is applied through circuit point 83 of FIG. 1 and circuit point 206 and lead 209 of FIG. 2 to the control "C" input terminal of conventional bilateral switch 265. While this logic 1 signal is present, the cylinder combustion pressure signal is applied to holding capacitor 266 through conducting bilateral switch 265. The charge across capacitor 266 is applied to the non-inverting input terminal of conventional operational amplifier circuit 270 connected as a unity gain high impedance buffer amplifier circuit which isolates capacitor 266 from the remainder of the circuit. The output terminal of operational amplifier circuit 270 is applied to the non-inverting input terminal of conventional voltage comparator circuit 275, the inverting input terminal of which is connected to junction 274 between series resistors 272 and 273 connected across the positive polarity output terminal of the operating potential source and point of reference or ground potential 5. The maximum amplitude of the cylinder combustion pressure is determined and resistors 272 and 273 are so proportioned relative to each other that the potential upon junction 274 with respect to point of reference or ground potential 5 is substantially equal to the potential magnitude of the filter 4 output signal at the predetermined maximum cylinder combustion pressure amplitude. Should the potential charge upon capacitor 266 exceed the potential magnitude upon junction 274, indicating the predetermined maximum cylinder combustion pressure has been exceeded, the output signal of comparator circuit 275 switches from a logic 0 to a logic 1. Resistor 271 is the usual comparator circuit 275 pullup resistor. This logic 1 signal is applied through diode 276 and input resistor 277 to the base electrode of NPN transistor 280 in the proper polarity relationship to produce base-emitter drive current through an NPN transistor. As the collector electrode of NPN transistor 280 is connected to the positive polarity output terminal of the operating potential source through collector resistor 278 and the emitter electrode thereof is connected to point of reference or ground potential 5, this base-emitter drive current triggers NPN transistor 280 conductive through the collector-emitter electrodes. While transistor 280 is conductive, junction 279 is at substantially ground potential. This ground potential is applied through input resistor 281 to the inverting input terminal of conventional operational amplifier circuit 285, the non-inverting input terminal of which is connected to the reference potential $V_R$ through input resistor 282. With a ground potential upon the inverting input terminal and a positive polarity potential upon the non-inverting input terminal, the override signal integrator circuit including operational amplifier circuit 285 and integrator capacitor 283 begins to produce a positive going output ramp signal which is applied through resistor 284 to the inverting input terminal of summing junction operational amplifier circuit 235. This positive going signal is summed with the peak pressure error signal and the initial ignition spark timing advance signal by summing junction operational amplifier circuit 235 which produces a resultant negative going ignition spark timing retard signal upon output lead 240.

Figure 14:
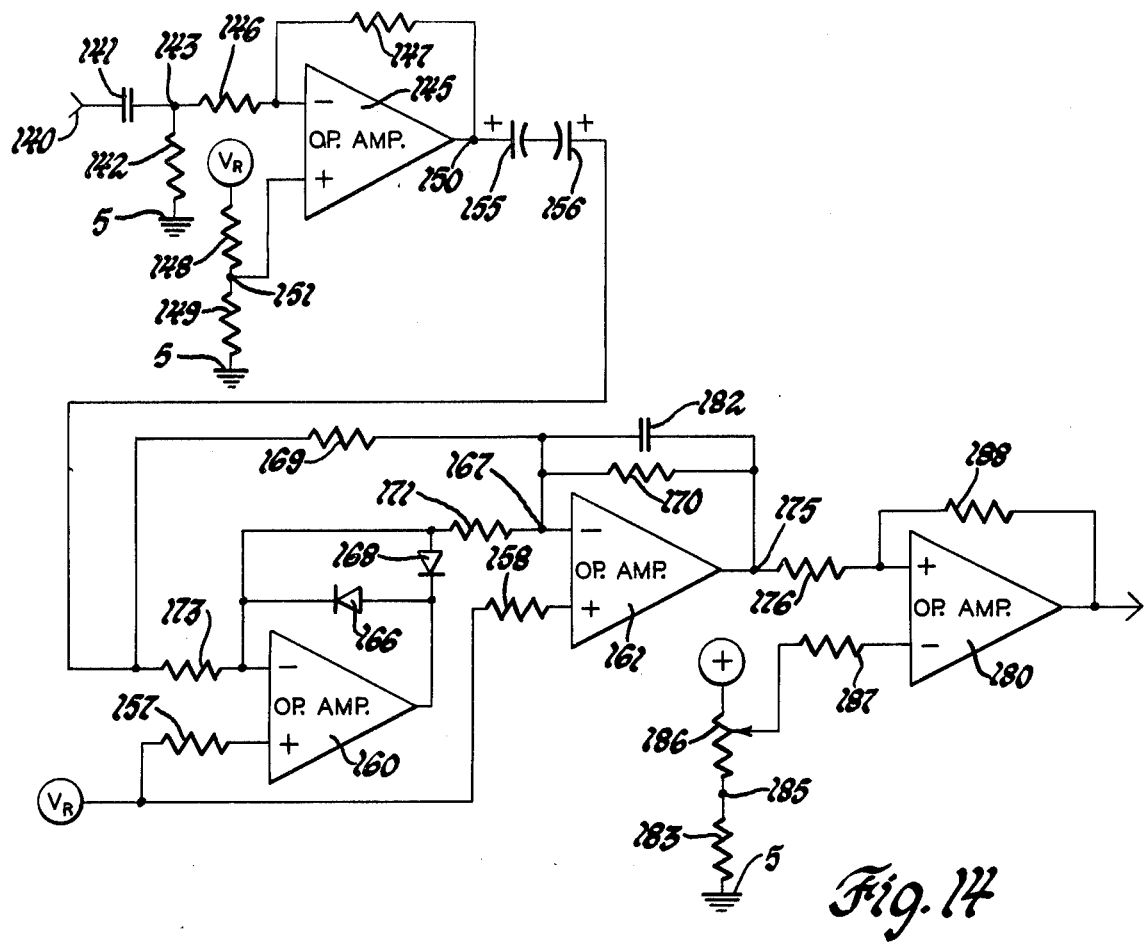
FIG. 14 is a schematic circuit for an engine knock detector circuit suitable for use with the ignition spark timing system of this invention.

Referring again to FIG. 1, the unfiltered output of signal charge amplifier circuit 3 is applied through lead 91 to the input terminal of a knock detector circuit 93. As is well known in the internal combustion engine art, under conditions of engine knock, a high frequency engine detonation or knock component is superimposed upon the cylinder combustion pressure signal. In a preferred embodiment, the knock detector circuit schematically illustrated in FIG. 14 is employed. The unfiltered output signal of charge amplifier circuit 3, FIG. 15A, is impressed through circuit point 140 of FIG. 14 across a high pass filter circuit comprising capacitor 141 and resistor 142 which filters out the low frequency cylinder combustion pressure signal component and passes the high frequency detonation of knock component. The output signal of this filter circuit appears upon junction 143 as the high frequency component signal which oscillates about zero or ground potential, as illustrated by FIG. 15B. This signal is applied through input resistor 146 to the inverting input terminal of a conventional operational amplifier circuit 145. Operational amplifier circuit 145 functions as a signal offset amplifier which raises the reference potential level, about which the high frequency component signal oscillates, to a selected value as determined by the level of the reference signal applied to the non-inverting input terminal of operational amplifier circuit 145 and the gain of operational amplifier circuit 145. In an actual embodiment, the reference potential level about which the high frequency component signal oscillates, is selected to be $V_R$ and the input resistor 146 and feedback resistor 147 of operational amplifier circuit 145 are proportioned to provide a gain of 2. Therefore, the level of the reference signal applied to the non-inverting input terminal of operational amplifier circuit 145 is equal to $V_R/4$. To provide this reference signal, resistors 148 and 149 are so proportioned that a reference signal level equal to $V_R/4$ appears upon junction 151 therebetween which is connected to the non-inverting input terminal of operational amplifier circuit 145. The high frequency component signal output of operational amplifier circuit 145, therefore, oscillates about a direct current reference potential level equal to $V_R$ and appears upon output terminal 150, as illustrated by the curve of FIG. 15C. This high frequency component output signal is applied through two back-to-back connected polarized capacitors 155 and 156 of a fullwave rectifier and filter circuit including operational amplifier circuits 160 and 161 and the associated circuitry. The potential level to which the output signal of this fullwave rectifier and filter circuit is referenced is determined by the value of the reference signal applied to the non-inverting input terminal of each of operational amplifiers 160 and 161. In an actual embodiment, this reference signal level is selected to be $V_R$ which is applied through respective input resistors 157 and 158 to the non-inverting input terminal of operational amplifier circuits 160 and 161. For negative going input signals, the output of operational amplifier circuit 160 is clamped to a value equal to the voltage drop across diode 166 and is disconnected from the summing junction 167 for operational amplifier circuit 161 by diode 168. Operational amplifier circuit 161, therefore, functions as a simple inverter circuit with input resistor 169 and feedback resistor 170 to provide a positive going output signal. For positive going input signals, operational amplifier circuit 160 operates as a normal amplifier connected to summing junction 167 through resistor 171. Operational amplifier circuit 160, therefore, functions as a simple inverter circuit with input resistor 173 and feedback resistor 171. Positive current enters the summing junction 167 through resistor 169 and negative current is drawn from this summing junction through resistor 171. Therefore, operational amplifier circuit 161 functions as a summing inverter, again giving a positive polarity output. This circuit becomes an averaging filter with the addition of capacitor 182 connected across resistor 170. The resulting output signal upon output terminal 175 is set forth in FIG. 15D and is the envelope of the curve of FIG. 15C. This output signal is applied through input resistor 176 to the non-inverting input terminal of conventional operational amplifier circuit 180 which functions as a voltage comparator circuit. The reference potential applied to the inverting input terminal of conventional operational amplifier circuit 180 is selected to be slightly above the value of $V_R$ and is so arranged that this reference signal is never less than $V_R$. Potentiometer 186 and resistor 183 are so proportioned that a potential drop equal to $V_R$ appears across resistor 183 at junction 185. Potentiometer 186 provides for calibration and adjustment, the potential across the movable contact thereof and point of reference or ground potential 5 being applied to the inverting input terminal of operational amplifier circuit 180 through input resistor 187. Consequently, when the output signal upon output terminal 175, FIG. 15D, rises to a value slightly above $V_R$, the output signal, FIG. 15E, of operational amplifier circuit 180 switches from a logic 0 to a logic 1 electrical engine knock indicating signal and so remains until the signal upon terminal 175 falls to a value near the reference potential level $V_R$. Feedback resistor 188 provides hysteresis for operational amplifier circuit 180. In an actual embodiment, therefore, the knock detector circuit employed produces a logic 1 engine knock indicating output signal with the presence of engine detonation or knock.

The logic 1 engine knock indicating output signal of knock detector circuit 93 is applied through lead 96 and circuit point 97 of FIG. 1 and circuit point 267, lead 268, diode 269 and resistor 277 of FIG. 2 to the base electrode of NPN transistor 280. This logic 1 signal triggers NPN transistor 280 conductive in a manner previously explained with regard to the cylinder combustion pressure amplitude override feature. Upon the conduction of NPN transistor 280, the override signal integrator circuit previously described operates in an identical manner in cooperation with summing junction operational amplifier circuit 235 to produce a negative polarity ignition spark retard signal upon output lead 240 which results in ignition spark retard as previously explained.

Referring to FIG. 2, the output terminal of operational amplifier circuit 285 is applied to the non-inverting input terminal of each of conventional operational amplifier circuits 289 and 290. The inverting input terminal of operational amplifier circuit 290 is connected to the source of reference potential $V_R$ and the inverting input terminal of operational amplifier circuit 289 is connected to junction 286 between series resistors 287 and 288. Series resistors 287 and 288 are connected across the source of reference potential $V_R$ and the engine speed signal $V_s$ and are so proportioned relative to each other that the potential upon junction 286 is of a positive polarity magnitude equal to that of the engine speed signal $V_s$ at a predetermined engine crankshaft angle.

While transistor 280 is not conducting, the positive polarity output terminal of the operating potential source is connected through series resistors 278 and 281 to the inverting input terminal of operational amplifier circuit 285. As this potential magnitude is greater than the magnitude of the reference potential $V_R$ applied through input resistor 282 to the non-inverting input terminal of operational amplifier circuit 285, the override signal integrator circuit produces a negative going ramp signal from the operating potential source potential level toward the reference potential level. When this signal has ramped down to a magnitude substantially equal to that of the reference potential, a logic 0 signal appears upon the output terminal of operational amplifier circuit 290. This ground potential signal drains current from the inverting input terminal of operational amplifier circuit 285 through resistor 292, diode 291 and the output device of operational amplifier circuit 290 to point of reference or ground potential. As a consequence, the output signal upon operational amplifier circuit 285 is maintained at a value substantially equal to the magnitude of the reference potential, a condition to which the summing junction operational amplifier circuit 235 is insensitive. Consequently, the operation of operational amplifier circuit 290 provides an advance limit of zero engine crankshaft degrees.

When NPN transistor 280 is conductive, the override signal integrator circuit produces an output ramp signal which ramps up from the reference potential magnitude. When this signal becomes substantially equal to the magnitude of the signal present upon junction 286, operational amplifier circuit 289 produces a logic 1 output signal which is applied through diode 293 and resistor 294 to the inverting input terminal of operational amplifier circuit 285. This signal tends to limit the output signal of operational amplifier circuit 285 at a level equal to the potential magnitude upon junction 286. Operational amplifier circuit 285, therefore, operates to limit the ignition spark retard produced by override signal integrator circuit 285 to a crankshaft angle as determined by the potential magnitude upon junction 286.

The output signal of up/down ignition spark timing error integrator circuit of FIG. 2 is applied to the non-inverting input terminal of each of operational amplifier circuits 295 and 296. The inverting input terminal of operational amplifier circuit 296 is connected to the source of reference potential $V_R$ and the inverting input terminal of operational amplifier circuit 295 is connected to junction 297 between series resistors 298 and 299. Series resistors 298 and 299 are so proportioned relative to each other that the potential upon junction 297 is equal to the potential magnitude level of the engine speed signal at a predetermined engine crankshaft angle. When the negative going ignition spark advance ramp output signal of up/down ignition spark timing error detector integrator circuit falls to a value equal to the potential upon junction 297, a logic 0 signal appears upon the output terminal of operational amplifier circuit 295. At this time, current is drained away from the inverting input terminal of operational amplifier circuit 230 through resistor 257 and diode 258, a condition which tends to limit the output signal of operational amplifier circuit 230 at a magnitude equal to that upon junction 297 to limit the engine speed advance to the engine crankshaft angle represented by the potential upon junction 297.

When the positive going ignition spark retard ramp output signal of up/down ignition spark timing error integrator circuit ramps up to a value equal to the reference potential $V_R$, a logic 1 signal appears upon the output terminal of operational amplifier 296 which is applied through diode 259 and resistor 264 to the inverting input terminal of operational amplifier circuit 230, a condition which limits the output signal of operational amplifier circuit 230 to a magnitude equal to that of the reference potential. Summing junction operational amplifier circuit 235 is insensitive to an input signal of this magnitude, consequently, operational amplifier circuit 296 operates to limit the retard signal produced by the up/down ignition spark timing error integrator circuit to 0° retard.

In summary, the peak cylinder combustion pressure ignition spark timing system of this invention:

(1) Senses the crank angle location of a cylinder combustion pressure peak, compares this crank angle with a predetermined crankshaft angle at which peak cylinder combustion pressure is desired to occur and advances or retards the ignition spark to maintain the cylinder combustion peak pressure at the desired engine crankshaft angle.

(2) Limits the effect of cycle to cycle combustion pressure peak variations by limiting the total crankshaft angle error that can result in advance or retard for any engine cylinder firing event.

(3) Limits the pressure amplitude by retarding the ignition spark in response to a peak cylinder combustion pressure greater than a predetermined value.

(4) Limits engine "knock" in response to an engine knock indicating signal produced with conditions of engine knock or detonation.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A method for timing the ignition spark events of a spark ignited internal combustion engine in a manner to achieve peak cylinder combustion pressure at a predetermined desired engine crankshaft angle relative to piston top dead center comprising the steps of: initially generating ignition spark events within a predetermined range of engine operating crankshaft angles relative to piston top dead center; generating a signal pulse having a leading edge coincident in time with the occurrence of actual peak cylinder combustion pressure in a selected engine cylinder which subsists thereafter for a preselected constant engine crankshaft rotation angle; generating during the subsistence of said signal pulse an electrical timing adjustment signal that changes in value at a substantially constant rate with time in a first direction before and in a second opposite direction after a predetermined engine crankshaft angle having a fixed relation to said predetermined desired engine crankshaft angle; sensing the value of said timing adjustment signal at the termination of said signal pulse; and adjusting the timing of said ignition spark events in accordance with the sensed value of said timing adjustment signal and in the direction relative to piston top dead center to achieve peak cylinder combustion pressure at said predetermined desired engine crankshaft angle.

2. A method for timing the ignition spark events of a spark ignited internal combustion engine in a manner to achieve peak cylinder combustion pressure at a predetermined desired engine crankshaft angle relative to piston top dead center comprising the steps of: initially generating ignition spark events within a predetermined range of engine operating crankshaft angles relative to piston top dead center; generating a signal pulse having a leading edge coincident in time with the occurrence of actual peak cylinder combustion pressure in a selected engine cylinder which subsists thereafter for a preselected constant engine crankshaft rotation angle; generating during the subsistence of said signal pulse an electrical timing adjustment signal that changes in value at a substantially constant rate with time in a first direction before and in a second opposite direction after a predetermined engine crankshaft angle having a fixed relation to said predetermined desired engine crankshaft angle; storing the value of said timing adjustment signal at the termination of said signal pulse; and initiating, at an engine crankshaft angle relative to piston top dead center determined by the value of said stored timing adjustment signal, the generation for each engine cylinder of an ignition dwell time signal that subsists for a preselected substantially constant engine crankshaft rotation angle.

3. A method for timing the ignition spark events of a spark ignited internal combustion engine in a manner to achieve peak cylinder combustion pressure at a predetermined desired engine crankshaft angle relative to piston top dead center comprising the steps of: initially generating ignition spark events within a predetermined range of engine operating crankshaft angles relative to piston top dead center; generating a signal pulse having a leading edge coincident in time with the occurrence of actual peak cylinder combustion pressure in a selected engine cylinder which subsists thereafter for a preselected constant engine crankshaft rotation angle; generating during the subsistence of said signal pulse an electrical timing adjustment signal that changes in value at a substantially constant rate with time in a first direction before and in a second opposite direction after a predetermined engine crankshaft angle having a fixed relation to said predetermined desired engine crankshaft angle; storing the value of said timing adjustment signal at the termination of said signal pulse; initiating, at an engine crankshaft angle relative to piston top dead center determined by the value of said stored timing adjustment signal, the generation for each engine cylinder of an ignition dwell time signal that subsists for a preselected substantially constant engine crankshaft rotation angle; and further adjusting the time of initiation of said ignition dwell signal in response to engine knock in the direction which results in the cessation of engine knock.

4. A method for timing the ignition spark events of a spark ignited internal combustion engine in a manner to achieve peak cylinder combustion pressure at a predetermined desired engine crankshaft angle relative to piston top dead center comprising the steps of: initially generating ignition spark events within a predetermined range of engine operating crankshaft angles relative to piston top dead center; generating a signal pulse having a leading edge coincident in time with the occurrence of actual peak cylinder combustion pressure in a selected engine cylinder which subsists thereafter for a preselected constant engine crankshaft rotation angle; generating during the subsistence of said signal pulse an electrical timing adjustment signal that changes in value at a substantially constant rate with time in a first direction before and in a second opposite direction after a predetermined engine crankshaft angle having a fixed relation to said predetermined desired engine crankshaft angle; storing the value of said timing adjustment signal at the termination of said signal pulse; initiating, at an engine crankshaft angle relative to piston top dead center determined by the value of said stored timing adjustment signal, the generation for each engine cylinder of an ignition dwell time signal that subsists for a preselected substantially constant engine crankshaft rotation angle; and further adjusting the time of initiation of said ignition dwell time signal in response to peak cylinder combustion pressure values greater than a predetermined level in the direction to reduce peak cylinder combustion pressure.

5. A peak cylinder combustion pressure ignition spark timing system for timing the ignition spark events of a spark ignited internal combustion engine in a manner to achieve peak cylinder combustion pressure at a predetermined desired engine crankshaft angle relative to piston top dead center comprising: means for producing an electrical peak cylinder combustion pressure signal when the combustion pressure of a selected engine cylinder reaches a peak value; circuit means initiated by said peak cylinder combustion pressure signal for generating a signal pulse which subsists thereafter for a preselected constant engine crankshaft rotation angle; circuit means for producing first and second opposite polarity electrical signals which reverse polarity at a predetermined engine crankshaft angle having a fixed relation to said predetermined desired engine crankshaft angle; circuit means responsive to said signal pulse and a selected one of said first and second electrical signals for producing an electrical timing adjustment signal which changes in value at a substantially constant rate with time in a first direction before said predetermined engine crankshaft angle having a fixed relation to said predetermined desired engine crankshaft angle and responsive to said signal pulse and the other one of said first and second electrical signals for producing an electrical timing adjustment signal which changes in value at a substantially constant rate with time in a second opposite direction after said predetermined engine crankshaft angle having a fixed relation to said predetermined desired engine crankshaft angle; means for storing said timing adjustment signal at the termination of said signal pulse; circuit means for initiating, at an engine crankshaft angle relative to piston top dead center determined by the value of said stored timing adjustment signal, the generation for each engine cylinder of an ignition dwell time signal and for maintaining said ignition dwell time signal for a preselected substantially constant engine crankshaft rotation angle; and circuit means including an electrically energizable ignition coil primary winding responsive to said ignition dwell time signal for effecting the energization and deenergization of said ignition coil primary winding upon the initiation and termination, respectively, of said ignition dwell time signal.

6. A peak cylinder combustion pressure ignition spark timing system for timing the ignition spark events of a spark ignited internal combustion engine in a manner to achieve peak cylinder combustion pressure at a predetermined desired engine crankshaft angle relative to piston top dead center comprising: means for producing an electrical peak cylinder combustion pressure signal when the combustion pressure of a selected monitored engine cylinder reaches a peak value; circuit means initiated by said peak cylinder combustion pressure signal for generating a signal pulse which subsists thereafter for a preselected constant engine crankshaft rotation angle; circuit means for producing first and second opposite polarity electrical signals which reverse polarity at a predetermined engine crankshaft angle having a fixed relation to said predetermined desired engine crankshaft angle; circuit means responsive to said signal pulse and a selected one of said first and second electrical signals for producing an electrical timing adjustment signal which changes in value at a substantially constant rate with time in a first direction before said predetermined engine crankshaft angle having a fixed relation to said predetermined desired engine crankshaft angle and responsive to said signal pulse and the other one of said first and second electrical signals for producing an electrical timing adjustment signal which changes in value at a substantially constant rate with time in a second opposite direction after said predetermined engine crankshaft angle having a fixed relation to said predetermined desired engine crankshaft angle; means for storing said timing adjustment signal at the termination of said signal pulse; means responsive to said stored timing adjustment signal for producing a peak pressure error signal; circuit means responsive to said peak pressure error signal for producing an ignition spark timing output signal; circuit means for initiating, at an engine crankshaft angle relative to piston top dead center determined by the value of said ignition spark timing signal, the generation for each engine cylinder of an ignition dwell time signal and for maintaining said ignition dwell time signal for a preselected substantially constant engine crankshaft rotation angle; and circuit means including an electrically energizable ignition coil primary winding responsive to said ignition dwell time signal for effecting the energization and deenergization of said ignition coil primary winding upon the initiation and termination, respectively, of said ignition dwell time signal.

7. A peak cylinder combustion pressure ignition spark timing system for timing the ignition spark events of a spark ignited internal combustion engine in a manner to achieve peak cylinder combustion pressure at a predetermined desired engine crankshaft angle relative to piston top dead center comprising: means for producing an electrical peak cylinder combustion pressure signal when the combustion pressure of a selected engine cylinder reaches a peak value; circuit means initiated by said peak cylinder combustion pressure signal for generating a signal pulse which subsists thereafter for a preselected constant engine crankshaft rotation angle; circuit means for producing first and second opposite polarity electrical signals which reverse polarity at a predetermined engine crankshaft angle having a fixed relation to said predetermined desired engine crankshaft angle; circuit means responsive to said signal pulse and a selected one of said first and second electrical signals for producing an electrical timing adjustment signal which changes in value at a substantially constant rate with time in a first direction before said predetermined engine crankshaft angle having a fixed relation to said predetermined desired engine crankshaft angle and responsive to said signal pulse and the other one of said first and second electrical signals for producing an electrical timing adjustment signal which changes in value at a substantially constant rate with time in a second opposite direction after said predetermined engine crankshaft angle having a fixed relation to said predetermined desired engine crankshaft angle; means for storing said timing adjustment signal at the termination of said signal pulse; means responsive to said stored timing adjustment signal for producing a peak pressure error signal; means for producing an electrical initial ignition spark advance signal; summing circuit means responsive to said peak pressure error signal and said initial ignition spark advance signal for producing an ignition spark timing output signal; circuit means for initiating, at an engine crankshaft angle relative to piston top dead center determined by the value of said ignition spark timing signal, the generation for each engine cylinder of an ignition dwell time signal and for maintaining said ignition dwell time signal for a preselected substantially constant engine crankshaft rotation angle; and circuit means including an electrically energizable ignition coil primary winding responsive to said ignition dwell time signal for effecting the energization and deenergization of said ignition coil primary winding upon the initiation and termination, respectively, of said ignition dwell time signal.

8. A peak cylinder combustion pressure ignition spark timing system for timing the ignition spark events of a spark ignited internal combustion engine in a manner to achieve peak cylinder combustion pressure at a predetermined desired engine crankshaft angle relative to piston top dead center comprising: means for producing an electrical peak cylinder combustion pressure signal when the combustion pressure of a selected engine cylinder reaches a peak value; circuit means initiated by said peak cylinder combustion pressure signal for generating a signal pulse which subsists thereafter for a preselected constant engine crankshaft rotation angle; circuit means for producing first and second opposite polarity electrical signals which reverse polarity at a predetermined engine crankshaft angle having a fixed relation to said predetermined desired engine crankshaft angle; circuit means responsive to said signal pulse and a selected one of said first and second electrical signals for producing an electrical timing adjustment signal which changes in value at a substantially constant rate with time in a first direction before said predetermined engine crankshaft angle having a fixed relation to said predetermined desired engine crankshaft angle and responsive to said signal pulse and the other one of said first and second electrical signals for producing an electrical timing adjustment signal which changes in value at a substantially constant rate with time in a second opposite direction after said predetermined engine crankshaft angle having a fixed relation to said predetermined desired engine crankshaft angle; means for storing said timing adjustment signal at the termination of said signal pulse; means responsive to said stored timing adjustment signal for producing a peak pressure error signal; means for producing an electrical excessive cylinder combustion pressure signal when cylinder combustion pressure exceeds a predetermined maximum value; means responsive to said excessive cylinder combustion pressure signal for producing an override signal; summing circuit means responsive to said peak pressure error signal and said override signal for producing an ignition spark timing output signal; circuit means for initiating, at an engine crankshaft angle relative to piston top dead center determined by the value of said ignition spark timing signal, the generation for each engine cylinder of an ignition dwell time signal and for maintaining said ignition dwell time signal for a preselected substantially constant engine crankshaft rotation angle; and circuit means including an electrically energizable ignition coil primary winding responsive to said ignition dwell time signal for effecting the energization and deenergization of said ignition coil primary winding upon the initiation and termination, respectively, of said ignition dwell time signal.

9. A peak cylinder combustion pressure ignition spark timing system for timing the ignition spark events of a spark ignited internal combustion engine in a manner to achieve peak cylinder combustion pressure at a predetermined desired engine crankshaft angle relative to piston top dead center comprising: means for producing an electrical peak cylinder combustion pressure signal when the combustion pressure of a selected engine cylinder reaches a peak value; circuit means initiated by said peak cylinder combustion pressure signal for generating a signal pulse which subsists thereafter for a preselected constant engine crankshaft rotation angle; circuit means for producing first and second opposite polarity electrical signals which reverse polarity at a predetermined engine crankshaft angle having a fixed relation to said predetermined desired engine crankshaft angle; circuit means responsive to said signal pulse and a selected one of said first and second electrical signals for producing an electrical timing adjustment signal which changes in value at a substantially constant rate with time in a first direction before said predetermined engine crankshaft angle having a fixed relation to said predetermined desired engine crankshaft angle and responsive to said signal pulse and the other one of said first and second electrical signals for producing an electrical timing adjustment signal which changes in value at a substantially constant rate with time in a second opposite direction after said predetermined engine crankshaft angle having a fixed relation to said predetermined desired engine crankshaft angle; means for storing said timing adjustment signal at the termination of said signal pulse; means responsive to said stored timing adjustment signal for producing a peak pressure error signal; means for producing an electrical engine knock indicating signal with the presence of engine knock conditions; means responsive to said engine knock indicating signal for producing an override signal; summing circuit means responsive to said peak pressure error signal and said override signal for producing an ignition spark timing output signal; circuit means for initiating, at an engine crankshaft angle relative to piston top dead center determined by the value of said ignition spark timing signal, the generation for each engine cylinder of an ignition dwell time signal and for maintaining said ignition dwell time signal for a preselected substantially constant engine crankshaft rotation angle; and circuit means including an electrically energizable ignition coil primary winding responsive to said ignition dwell time signal for effecting the energization and deenergization of said ignition coil primary winding upon the initiation and termination, respectively, of said ignition dwell time signal.

10. A peak cylinder combustion pressure ignition spark timing system for timing the ignition spark events of a spark ignited internal combustion engine in a manner to achieve peak cylinder combustion pressure at a predetermined desired engine crankshaft angle relative to piston top dead center comprising: means for producing an electrical peak cylinder combustion pressure signal when the combustion pressure of a selected engine cylinder reaches a peak value; circuit means initiated by said peak cylinder combustion pressure signal for generating a signal pulse which subsists thereafter for a preselected constant engine crankshaft rotation angle; circuit means for producing first and second opposite polarity electrical signals which reverse polarity at a predetermined engine crankshaft angle having a fixed relation to said predetermined desired engine crankshaft angle; circuit means responsive to said signal pulse and a selected one of said first and second electrical signals for producing an electrical timing adjustment signal which changes in value at a substantially constant rate with time in a first direction before said predetermined engine crankshaft angle having a fixed relation to said predetermined desired engine crankshaft angle and responsive to said signal pulse and the other one of said first and second electrical signals for producing an electrical timing adjustment signal which changes in value at a substantially constant rate with time in a second opposite direction after said predetermined engine crankshaft angle having a fixed relation to said predetermined desired engine crankshaft angle; means for storing said timing adjustment signal at the termination of said signal pulse; means responsive to said stored timing adjustment signal for producing a peak pressure error signal; means for producing an electrical initial ignition spark advance signal; means for producing an electrical excessive cylinder combustion pressure signal when cylinder combustion pressure exceeds a predetermined maximum value; means for producing an electrical engine knock indicating signal with the presence of engine knock conditions; means responsive to said excessive cylinder combustion pressure and engine knock indicating signals for producing an override signal; summing circuit means responsive to said peak pressure error signal, said initial ignition spark advance signal and said override signal for producing an ignition spark timing output signal; circuit means for initiating, at an engine crankshaft angle relative to piston top dead center determined by the value of said ignition spark timing signal, the generation for each engine cylinder of an ignition dwell time signal and for maintaining said ignition dwell time signal for a preselected substantially constant engine crankshaft rotation angle; and circuit means including an electrically energizable ignition coil primary winding responsive to said ignition dwell time signal for effecting the energization and deenergization of said ignition coil primary winding upon the initiation and termination, respectively, of said ignition dwell time signal.

* * * * *

UNITED STATES PATENT AND TRADEMARK OFFICE
CERTIFICATE OF CORRECTION

PATENT NO. : 4,153,019
DATED : May 8, 1979
INVENTOR(S) : Allan E. Laubenstein, Donald V. Starich, Mitchell L. Brown It is certified that error appears in the above-identified patent and that said Letters Patent are hereby corrected as shown below:

```
Abstract, line 3, after "predetermined" insert -- desired --.
Column 10, line 13, "Q" should read -- Q --.
Column 24, line 39, "is" should read -- in --.
Column 26, line 27, "455" should read -- 445 --;
           line 45, "ot" should read -- to --.
```

Signed and Sealed this

Eleventh Day of September 1979

[SEAL]

Attest:

LUTRELLE F. PARKER

*Attesting Officer*   *Acting Commissioner of Patents and Trademarks*